(12) United States Patent
Yoo et al.

(10) Patent No.: US 9,877,203 B2
(45) Date of Patent: Jan. 23, 2018

(54) CHANNEL FEEDBACK REPORTING FOR SHARED FREQUENCY SPECTRUM

(71) Applicant: QUALCOMM Incorporated, San Diego, CA (US)

(72) Inventors: Taesang Yoo, Riverside, CA (US); Siddhartha Mallik, San Diego, CA (US); Xiaoxia Zhang, San Diego, CA (US); Jing Sun, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/141,398

(22) Filed: Apr. 28, 2016

(65) Prior Publication Data

US 2016/0330630 A1 Nov. 10, 2016

Related U.S. Application Data

(60) Provisional application No. 62/158,412, filed on May 7, 2015.

(51) Int. Cl.
*H04W 16/14* (2009.01)
*H04L 1/16* (2006.01)
(Continued)

(52) U.S. Cl.
CPC .......... *H04W 16/14* (2013.01); *H04L 1/0003* (2013.01); *H04L 1/16* (2013.01); *H04L 5/0033* (2013.01);
(Continued)

(58) Field of Classification Search
CPC ............. H04W 16/14; H04W 72/0453; H04W 72/1284; H04L 5/0055
(Continued)

(56) References Cited

U.S. PATENT DOCUMENTS 8,644,867 B2 * 2/2014 Aiba ..................... H04L 1/0025
455/452.1
9,608,678 B1 * 3/2017 Sun ......................... H04B 1/10
(Continued)

OTHER PUBLICATIONS

ISA/EP, Partial International Search Report of the International Searching Authority, PCT App. No. PCT/US2016/030170, Jul. 15, 2016, European Patent Office, Rijswijk, NL, 6 pgs.
ISA/EP, International Search Report and Written Opinion of the International Searching Authority, Int'l Application No. PCT/US20/6/030170, Oct. 28, 2016, European Patent Office, Rijswijk, NL, 18 pgs.

*Primary Examiner* — Cong Tran
(74) *Attorney, Agent, or Firm* — Holland & Hart LLP

(57) ABSTRACT

Methods, systems, and devices are described for wireless communication. A device may use enhanced reporting mechanisms to support control information reporting on shared spectrum. In some cases, a device may utilize enhanced component carriers (eCCs) for data transmissions. In one example, the device may transmit control information (e.g., ACK/NACK, CSI, etc.) to a corresponding device using a CCA exempt transmission (CET). In another example, a device may report control information quasi-periodically. For instance, a device may be assigned a specified interval and a control feedback window for reporting control information (e.g., CSI). The window may provide a duration prior and subsequent to the specified interval during which a UE may transmit control information. For example, the device may perform a CCA reserving the channel for a duration that does not include the specified interval but may transmit feedback information based on determining the specified interval falls within the assigned window.

17 Claims, 13 Drawing Sheets

(51) Int. Cl.
*H04L 5/00* (2006.01)
*H04L 1/00* (2006.01)
*H04W 24/10* (2009.01)
*H04W 48/16* (2009.01)
*H04W 72/04* (2009.01)
*H04W 72/08* (2009.01)
*H04W 72/12* (2009.01)

(52) U.S. Cl.
CPC .......... *H04L 5/0048* (2013.01); *H04L 5/0055* (2013.01); *H04L 5/0057* (2013.01); *H04L 5/0073* (2013.01); *H04W 24/10* (2013.01); *H04W 48/16* (2013.01); *H04W 72/0453* (2013.01); *H04W 72/085* (2013.01); *H04W 72/1284* (2013.01)

(58) Field of Classification Search
USPC ..... 455/454, 450, 501, 515, 509, 63.1, 66.1, 455/67.11, 432.1, 69; 370/328, 329, 330, 370/338, 334, 346
See application file for complete search history.

(56) References Cited

U.S. PATENT DOCUMENTS

| | | | |
|---|---|---|---|
| 2008/0268785 A1* | 10/2008 | McCoy | H04L 1/0026 455/67.11 |
| 2009/0181691 A1* | 7/2009 | Kotecha | H04B 7/0417 455/452.1 |
| 2011/0255570 A1* | 10/2011 | Fujiwara | H04B 1/7143 375/133 |
| 2011/0310821 A1* | 12/2011 | Kim | H04B 7/15542 370/329 |
| 2012/0307781 A1* | 12/2012 | Enomoto | H04L 1/1861 370/329 |
| 2014/0321394 A1* | 10/2014 | Nogami | H04L 5/0044 370/329 |
| 2015/0049709 A1 | 2/2015 | Damnjanovic et al. | |
| 2015/0098412 A1 | 4/2015 | Yerramalli et al. | |
| 2015/0098437 A1 | 4/2015 | Chen et al. | |
| 2015/0103777 A1* | 4/2015 | Chen | H04L 5/0044 370/329 |
| 2015/0103782 A1 | 4/2015 | Xu et al. | |

\* cited by examiner

CHANNEL FEEDBACK REPORTING FOR SHARED FREQUENCY SPECTRUM

CROSS REFERENCES

The present application for patent claims priority to U.S. Provisional Patent Application No. 62/158,412 by Yoo et al., entitled "Channel Feedback Reporting for CCs," filed May 7, 2015, assigned to the assignee hereof.

BACKGROUND

Field of Disclosure

The following relates generally to wireless communication, and more specifically to channel feedback reporting for shared frequency spectrum.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a first wireless multiple-access communication system may operate according to a radio access technology (RAT), such as LTE, and may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). A second wireless multiple-access communications system may operate according to a different RAT, such as Wi-Fi, and may include a number of base stations or access points (APs), each simultaneously supporting communication for multiple mobile devices or stations (STAs). APs may communicate with STAs on downstream and upstream links. In some cases both types of communication systems may operate in the presence of one another and may use shared resources.

In a wireless local area network (WLAN), such as Wi-Fi, an AP may communicate with multiple STAs over a shared radio frequency spectrum. The STAs may use contention procedures that include communicating one or more control frames prior to establishing a communication link, such that confirmation of the communication link via exchange of control frames limits interference experienced by nearby communication devices. One example of such techniques include Request to Send (RTS) and Clear to Send (CTS) messaging, where, for example, a STA looking to communicate with another device (e.g., another STA or AP), may first send an RTS frame to the device. Once the recipient device receives the RTS frame, the recipient device may confirm the communication link by sending a CTS frame. After the CTS frame is received by the STA, the STA may then begin transmitting data to the recipient device. In this way, RTS/CTS messaging can reduce frame collisions by enabling a device, such as a STA or AP, to in essence clear the communication path before transmitting data to an AP or STA.

In an LTE network, a base station and a UE may communicate over a dedicated frequency spectrum or over different frequency bands of the radio frequency spectrum (e.g., a dedicated radio frequency band and a shared radio frequency band) of a cellular network. With increasing data traffic in cellular networks that use a dedicated (e.g., licensed) radio frequency band, offloading of at least some data traffic to a shared (e.g., unlicensed) radio frequency spectrum may provide a cellular operator with opportunities for enhanced data transmission capacity. A shared radio frequency spectrum may also provide service in areas where access to a dedicated radio frequency spectrum is unavailable. An LTE device that is configured for operation in shared frequency spectrum may be considered to be an LTE-Unlicensed (LTE-U) device. An LTE-U device may be configured for operation in dedicated radio frequency spectrum, using a standalone carrier in shared radio frequency spectrum, or using shared radio frequency spectrum in addition to dedicated radio frequency spectrum.

Prior to gaining access to and communicating over a shared radio frequency spectrum, a base station or UE may perform a listen before talk (LBT) procedure to contend for access to the shared radio frequency spectrum. This LBT procedure may be compatible with contention procedures used by Wi-Fi devices to gain access to the shared radio frequency spectrum. An LBT procedure may include performing a clear channel assessment (CCA) procedure to determine whether a channel of the shared radio frequency spectrum is available. Since a UE or base station first monitors the channel during the CCA to detect if the channel is occupied, a UE or base station may not win control of the channel with each LBT procedure In some cases, a device, such as an LTE/LTE-U UE, may report control information (e.g. acknowledgement (ACK)/ negative ACK (NACK), channel state information (CSI), etc.) periodically or aperiodically to a corresponding LTE/ LTE-U base station. For periodic reporting, the UE may send the control information according to an interval, specified by the base station, while for aperiodic reporting the UE may send control information in response to receiving a trigger from the base station. However, as mentioned above, the UE may fail to win control of the channel after performing an LBT procedure for periods corresponding to the designated interval. Therefore, the UE may fail to transmit control information to the base station under various circumstances. In the case of aperiodic reporting, the UE may fail to report the control information until the UE performs a successful LBT procedure. Delayed or failed control feedback reports may prevent the network from developing current channel estimates resulting in decreased link performance or throughput.

SUMMARY

A device may use enhanced reporting mechanisms to support control information reporting on shared spectrum. In some cases, a device may utilize enhanced component carriers (eCCs) for data transmissions. In one example, the device may transmit control information (e.g., ACK/NACK, CSI, etc.) to a corresponding device using a CCA exempt transmission (CET). In another example, a device may report control information quasi-periodically. For example, a UE may be configured with a specified periodic CSI reporting interval and a control feedback window. While the periodic CSI reporting interval may designate a particular TTI for reporting periodic CSI, the control feedback window may provide a duration prior or subsequent to the designated TTI during which the UE may transmit control information. For example, the UE may perform an LBT procedure to gain access to the channel and transmit the periodic CSI report at the beginning of a control feedback window that is within a certain time period of, or includes, the designated reporting TTI. The LBT procedure may include multiple attempts to perform a CCA procedure to reserve the channel for transmitting the periodic CSI feedback.

A method of wireless communication is described. The method may include communicating with an eNB over a frequency channel of a shared frequency band, receiving a data transmission from the eNB over the frequency channel of the shared frequency band, determining ACK/NACK information for the data transmission, and transmitting the ACK/NACK information in a clear channel assessment (CCA) exempt feedback transmission to the eNB over the frequency channel of the shared frequency band, wherein the ACK/NACK information is mapped to designated resources of an uplink control channel structure for the CCA-exempt feedback transmission.

An apparatus for wireless communication is described. The apparatus may include means for communicating with an eNB over a frequency channel of a shared frequency band, means for receiving a data transmission from the eNB over the frequency channel of the shared frequency band, means for determining ACK/NACK information for the data transmission, and means for transmitting the ACK/NACK information in a CCA exempt feedback transmission to the eNB wherein the ACK/NACK information is mapped to designated resources of an uplink control channel structure for the CCA-exempt feedback transmission.

A further apparatus for wireless communication is described. The apparatus may include a processor, memory in electronic communication with the processor, and instructions stored in the memory and operable, when executed by the processor, to cause the apparatus to communicate with an eNB using a frequency channel of a shared frequency band, receive a data transmission from the eNB over the frequency channel of the shared frequency band, determine ACK/NACK information for the data transmission, and transmit the ACK/NACK information in a CCA exempt feedback transmission to the eNB via the frequency channel of the shared frequency band, wherein the ACK/NACK information is mapped to designated resources of an uplink control channel structure for the CCA-exempt feedback transmission.

A non-transitory computer-readable medium storing code for wireless communication is described. The code may include instructions executable to communicate with an eNB using a frequency channel of a shared frequency band, receive a data transmission from the eNB over the frequency channel of the shared frequency band, determine ACK/NACK information for the data transmission, and transmit the ACK/NACK information in a CCA exempt feedback transmission to the eNB via the frequency channel of the shared frequency band, wherein the ACK/NACK information is mapped to designated resources of an uplink control channel structure for the CCA-exempt feedback transmission.

Some examples of the method, apparatuses, or non-transitory computer-readable medium described herein may further include processes, features, means, or instructions for determining uplink scheduling feedback or channel state information (CSI) feedback, and transmitting, in the CCA-exempt feedback transmission, the uplink scheduling feedback or the CSI feedback. Additionally or alternatively, some examples may include processes, features, means, or instructions for determining a target modulation and coding scheme (MCS) for a subsequent data transmission based at least in part on channel measurements of one or more reference signals associated with the current data transmission, and the transmitted CSI feedback comprises an indicator associated with the target MCS.

Some examples of the method, apparatuses, or non-transitory computer-readable medium described herein may further include processes, features, means, or instructions for identifying a current MCS for the data transmission, determining a channel quality delta between the current MCS and the target MCS, and the indicator associated with the target MCS comprises the channel quality delta. Additionally or alternatively, in some examples the one or more reference signals comprise any of a cell-specific reference signals (CRS), a demodulation reference signal (DM-RS), a UE-specific reference signal (UE-RS), or combinations thereof.

In some examples of the method, apparatuses, or non-transitory computer-readable medium described herein, the determining the target MCS for the subsequent data transmission comprises estimating a quality of a channel from the eNB based at least in part on the CRS and an identified precoding matrix for the current data transmission. In some examples, the uplink control channel structure comprises a subset of frequency resources of the frequency channel of the shared frequency band. Additionally or alternatively, in some examples the start of the CCA-exempt feedback transmission occurs less than a predetermined CCA time period from an end of the data transmission.

In some examples of the method, apparatuses, or non-transitory computer-readable medium described herein, the frequency channel of the shared frequency band comprises an eCC configured for the UE in a standalone operation mode. Additionally or alternatively, some examples may include processes, features, means, or instructions for receiving a feedback configuration for providing feedback for transmissions via the frequency channel of the shared frequency band, wherein the feedback configuration indicates providing the feedback in the CCA-exempt feedback transmission, a CCA-compliant feedback transmission, or combinations thereof.

A method of wireless communication is described. The method may include identifying a transmission time interval (TTI) associated with transmitting first CSI feedback for a CC operating in a standalone operation mode over a shared frequency band based at least in part on a CSI feedback configuration, identifying a transmission, from the eNB, reserving one or more channels of the shared frequency band for communication via the CC, the transmission identifying a time division duplex (TDD) configuration for the CC over a specified time duration, determining an uplink transmission window of one or more uplink transmission windows during the specified time duration for transmitting the first CSI feedback based at least in part on a timing characteristic of the uplink transmission window relative to the identified TTI, and performing a CSI feedback transmission procedure to transmit the first CSI feedback during the uplink transmission window.

An apparatus for wireless communication is described. The apparatus may include means for identifying a TTI associated with transmitting first CSI feedback for a CC operating in a standalone operation mode over a shared frequency band based at least in part on a CSI feedback configuration, means for identifying a transmission, from the eNB, reserving one or more channels of the shared frequency band for communication via the CC, the transmission identifying a TDD configuration for the CC over a specified time duration, means for determining an uplink transmission window of one or more uplink transmission windows during the specified time duration for transmitting the first CSI feedback based at least in part on a timing characteristic of the uplink transmission window relative to the identified TTI, and means for performing a CSI feedback transmission procedure to transmit the first CSI feedback during the uplink transmission window.

A further apparatus for wireless communication is described. The apparatus may include a processor, memory in electronic communication with the processor, and instructions stored in the memory and operable, when executed by the processor, to cause the apparatus to identify a TTI associated with transmitting first CSI feedback for a CC operating in a standalone operation mode over a shared frequency band based at least in part on a CSI feedback configuration, identify a transmission, from the eNB, reserving one or more channels of the shared frequency band for communication via the CC, the transmission identifying a TDD configuration for the CC over a specified time duration, determine an uplink transmission window of one or more uplink transmission windows during the specified time duration for transmitting the first CSI feedback based at least in part on a timing characteristic of the uplink transmission window relative to the identified TTI, and perform a CSI feedback transmission procedure to transmit the first CSI feedback during the uplink transmission window.

A non-transitory computer-readable medium storing code for wireless communication is described. The code may include instructions executable to identify a TTI associated with transmitting first CSI feedback for a CC operating in a standalone operation mode over a shared frequency band based at least in part on a CSI feedback configuration, identify a transmission, from the eNB, reserving one or more channels of the shared frequency band for communication via the CC, the transmission identifying a TDD configuration for the CC over a specified time duration, determine an uplink transmission window of one or more uplink transmission windows during the specified time duration for transmitting the first CSI feedback based at least in part on a timing characteristic of the uplink transmission window relative to the identified TTI, and perform a CSI feedback transmission procedure to transmit the first CSI feedback during the uplink transmission window.

In some examples of the method, apparatuses, or non-transitory computer-readable medium described herein, the CSI feedback transmission procedure comprises performing a first CCA-compliant feedback transmission procedure over the one or more channels during a first uplink TTI of the uplink transmission window. Additionally or alternatively, in some examples the CSI feedback transmission procedure comprises transmitting the first CSI feedback upon a successful reservation of the one or more channels based at least in part on the first CCA-compliant feedback transmission procedure.

In some examples of the method, apparatuses, or non-transitory computer-readable medium described herein, the CSI feedback transmission procedure comprises determining that the one or more channels are busy during the first uplink TTI based at least in part on the first CCA-compliant feedback transmission procedure, and the CSI feedback transmission procedure comprises performing a second CCA-compliant feedback transmission procedure over the one or more channels during a second, subsequent uplink TTI of the uplink transmission window. Additionally or alternatively, some examples may include processes, features, means, or instructions for identifying a discovery reference signal (DRS) configuration for the CC, the DRS configuration indicating a cyclical transmission pattern for reference signals transmitted in the one or more channels, and performing channel measurements for the one or more channels based at least in part on the cyclical transmission pattern.

In some examples of the method, apparatuses, or non-transitory computer-readable medium described herein, the first CSI feedback comprises a wideband channel quality for a frequency range spanning the one or more channels. Additionally or alternatively, in some examples the timing characteristic comprises the uplink transmission window being within a time threshold of the identified TTI.

In some examples of the method, apparatuses, or non-transitory computer-readable medium described herein, the timing characteristic comprises the uplink transmission window including the identified TTI.

Some examples of the methods, apparatuses, or non-transitory computer-readable media described herein may further include processes, features, means, or instructions for channel feedback reporting for CCs (e.g., eCC in standalone operation, etc.). Further scope of the applicability of the described systems, methods, apparatuses, or computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
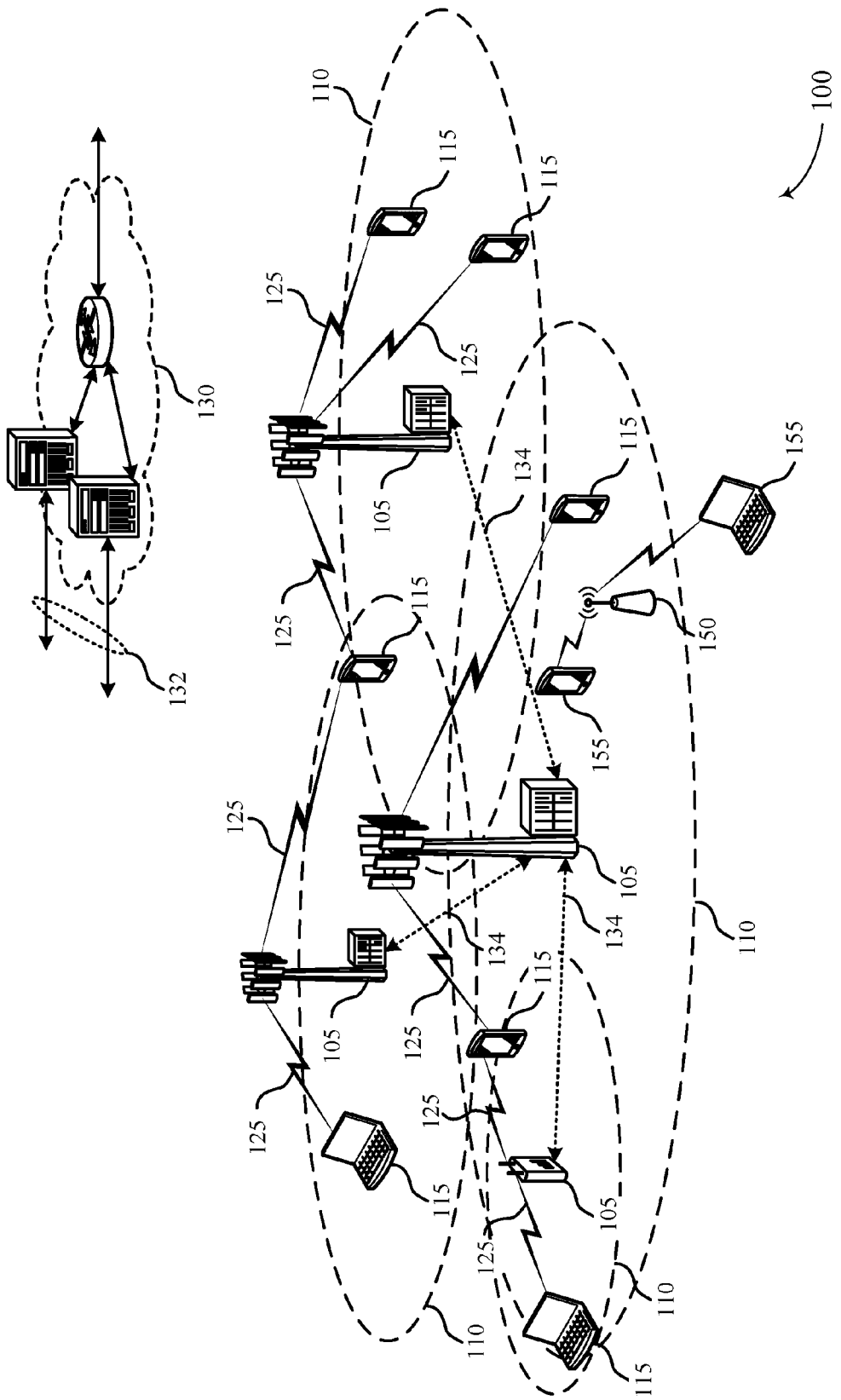
FIG. 1 illustrates an example of a wireless communications system that supports channel feedback reporting for component carriers (CCs) (e.g., eCC in standalone operation, etc.) in accordance with various aspects of the present disclosure.

According to the present disclosure, a device may use enhanced reporting mechanisms to support control information reporting on shared spectrum. Aspects of the disclosure are described in the context of a wireless communication system. For example, a UE may be configured for communication with a base station via an LTE/LTE-A component carrier (e.g., enhanced component carrier (eCC), etc.) operating in a standalone mode in an unlicensed or shared frequency spectrum band. Unlike LTE/LTE-A operation in licensed frequency bands, reporting of CSI (e.g., periodic, aperiodic, etc.) for unlicensed or shared bands may be conditional on a base station gaining access to the channel in a listen before talk (LBT) procedure, allocating uplink subframes, and the UE successfully gaining access to the channel in an LBT procedure. A UE operating in licensed band may be allocated control channel resources for transmission of periodic CSI according to a periodic CSI reporting schedule. A UE reporting periodic CSI via a standalone CC or eCC in shared spectrum may not be able to transmit the CSI in transmission time intervals (TTIs) corresponding to the periodic reporting interval. In embodiments, the UE reports CSI quasi-periodically via a frequency channel of a shared frequency band based on a periodic reporting schedule and control feedback window. As used herein, a shared frequency band may refer to a frequency band within an unlicensed or shared spectrum (e.g., licensed to multiple operators or a prioritized operator). The UE may perform an LBT procedure to gain access to the channel to transmit the periodic CSI report at the beginning of the control feedback window, if the window is within a certain time period of, or includes, the designated reporting TTI. The LBT procedure may include multiple attempts to perform a clear channel assessment (CCA) procedure to reserve the channel for transmitting the quasi-periodic CSI feedback.

Aperiodic CSI reports may also be triggered for a UE communicating with a base station via a standalone CC or eCC in shared spectrum. Unlike in licensed spectrum, reference signals may not be present on semi-statically configured periodic time-frequency locations for a CC or eCC in shared spectrum. In embodiments, reference signals for determining aperiodic CSI are dynamically configured for subframes where an aperiodic CSI request is sent to the UE. Presence of reference signals (e.g., CRS, UE-RS, CSI-RS, etc.) may be signaled in the DL grants for UEs with scheduled DL resources for the subframe so that other, non-CSI triggered UEs are able to do proper PDSCH rate matching around the reference signals. The aperiodic CSI may be computed based on the latest received reference signal, which may be the reference signals in the DL burst with the aperiodic CSI trigger, or for a channel where the base station could not clear the channel using CCA, the latest instance of reference signals according to a discovery reference signal (DRS) configuration.

Additionally or alternatively, a UE may utilize a fast feedback reporting scheme in which the device transmits control information (e.g., ACK/NACK, CSI, etc.) mapped to a control channel structure in a CCA exempt transmission (CET) following reception of a DL data transmission. The CSI may be determined based on reference signals (e.g., CRS with indicated precoding, DM-RS, etc.) in the DL data transmission. The CSI may include CQI reporting for fast link adaptation, which may be reported in the form of a delta CQI. The UE may be semi-statically configured to report fast feedback, regular feedback using PUCCH or PUSCH resources, or both fast feedback and regular feedback. These and other aspects of the disclosure are further illustrated by and described with reference to apparatus diagrams, system diagrams, and flowcharts.

FIG. 1 illustrates an example of a wireless communications system 100 that supports feedback reporting for eCCs in accordance with various aspects of the present disclosure. The wireless communications system 100 includes base stations 105, UEs 115, APs 150, STAs 155, and a core network 130. In some examples, the wireless communications system 100 may be a Long Term Evolution (LTE)/LTE-Advanced (LTE-A) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115. The base stations 105 may support, and may communicate with one another to fast recovery procedures. For example, the base stations 105 may interface with the core network 130 through backhaul links 132 (e.g., S1, etc.). The base stations 105 may also communicate with one another over backhaul links 134 (e.g., X1, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) in some examples.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like. The UEs 115 may communicate with base stations 105, and may support fast recovery procedures.

A UE may be configured with multiple carriers in carrier aggregation (CA) configuration, and the communication links 125 may represent such multicarrier CA configurations. A carrier may also be referred to as a component carrier (CC), a layer, a channel, etc. The term "component carrier" may refer to each of the multiple carriers utilized by a UE in CA operation, and may be distinct from other portions of system bandwidth. For instance, a CC may be a relatively narrow-bandwidth carrier susceptible of being utilized independently or in combination with other component carriers. Each CC may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual CC may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

A UE 115 may communicate with a single base station 105 utilizing multiple carriers, and may also communicate with multiple base stations 105 simultaneously on different carriers. Each cell of a base station 105 may include an UL CC and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., ACK/NACK, channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

In some cases, wireless communications system 100 may utilize one or more enhanced component carriers (eCCs). An enhanced component carrier (eCC) may be characterized by one or more features including: wider bandwidth, shorter symbol duration, shorter transmission time interval (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). An eCC may utilize dynamic time division duplex (TDD) operation (i.e., it may switch from downlink (DL) to uplink (UL) operation for short bursts according to dynamic conditions).

In some cases, an eCC may utilize a different symbol duration than other component carriers (CCs), which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 μs).

In some examples, the wireless communications system 100 may operate according to a first radio access technology (e.g., a cellular radio access technology, such as an LTE/LTE-A technology), but operate in the presence of one or more networks or nodes operating according to a second radio access technology (e.g., a Wi-Fi technology). By way of example, FIG. 1 shows a network comprised of a Wi-Fi access point (AP) 150 in communication with Wi-Fi stations (STAs) 155. In some examples, a UE 115 or base station 105 may be an LTE-U device that supports operation in shared bands used by Wi-Fi. LTE/LTE-U devices may additionally support eCC operation for transmission on licensed or unlicensed bands. A STA 155 or AP 150 may be Wi-Fi devices that may support LTE but may not be configured for LTE-U or eCC operation. In the interest of clarity, LTE-U devices will be referred to as base stations 105 or UEs 115, while non LTE-U devices will be referred to as APs 150 or STAs 155.

Before transmitting over a shared channel, an LTE-U device, such as a base station 105 or UE 115, may perform an LBT procedure to win control of the shared channel. An LBT procedure may include performing a CCA to determine if the shared channel is available. If the device determines the channel is available, it may transmit a preamble (e.g., Wi-Fi preamble, channel usage beacon (CUBS), etc.) to alert other devices that it is about to transmit over the channel. Otherwise, if the channel is not available, the device may refrain from transmitting over the channel. In certain cases, a device may transmit over a channel without observing CCA protocol using a transmission that complies with various CET rules. CET rules may include, for example, a maximum duration or maximum percentage of time or frequency resources that can be used in transmissions without using a CCA procedure prior to transmission. In some examples, CET rules include a maximum duty cycle of 5%.

An LTE-U device, such as a UE 115, may transmit CSI feedback information to another LTE-U device (e.g., an eNB, etc.). The CSI may include channel quality information (CQI), rank indication (RI), or a precoding matrix indicator (PMI). This information may be used by the eNB to determine a modulation and coding scheme (MCS), rank, precoding scheme, and the like. The CSI information may be reported, by the UE, either periodically or aperiodically. For example, for periodic CSI reporting, a base station 105 may direct a UE 115 to report CSI information on allocated reporting resources according to a specified interval. In some cases, the reporting resources for periodic CSI reporting are unique in either the time or frequency domain from CSI reporting resources specified for other UEs 115 within the coverage area. The base station 105 may expect a response from the UE 115 on the specified reporting resources and correlate information received during that interval with the scheduled UE 115. For instance, the base station 105 may identify a UE 115 based on the time and frequency resources used to receive the CSI report. In some cases, the periodic CSI information may be reported using physical uplink control channel (PUCCH) resources. For aperiodic reporting, a base station 105 may send a trigger to UE 115 that triggers UE 115 to report CSI information. After receiving the trigger, the UE 115 may transmit the CSI information to the base station 105. In some cases, the aperiodic CSI report may be transmitted using physical uplink shared channel (PUSCH) resources.

An LTE-U device, such as a base station 105 or UE 115, may utilize a single CC in either dedicated spectrum or shared spectrum. In other instances, the LTE-U device may utilize multiple CCs, such as a PCC (e.g., associated with dedicated spectrum) and an SCC (e.g., associated with shared spectrum). In some cases, the LTE-U device may utilize one or more eCCs or a combination of eCCs and CCs for transmissions. An LTE-U device using multiple carriers may transmit CSI reports, for both the primary and secondary CCs, on the primary CC using uplink resources allocated by a base station 105. An LTE-U device using a single CC or a single eCC associated with shared spectrum may not be allocated dedicated uplink resources to transmit CSI resources. As mentioned above, the LTE-U device may perform an LBT procedure before transmitting on a shared channel, and in some cases, may refrain from transmitting if it is determined that the channel is occupied. Therefore, in the case of periodic reporting, the LTE-U device may fail to win the channel for a duration that includes the specified reporting interval and fail to transmit CSI information. In the case of aperiodic reporting, the LTE-U device may wait to transmit CSI information until the next successful LBT procedure. Delayed or failed CSI feedback reports may prevent the network from developing current channel estimates resulting in decreased link performance or throughput.

A UE 115 may use enhanced reporting mechanisms to support control information reporting on shared spectrum. In some cases, the UE 115 may utilize enhanced component carriers (eCCs) for data transmissions. In one example, the UE 115 may transmit control information to a base station 105 using a CET. For instance, the UE 115 may transmit ACK/NACKs to a base station 105 via the CET transmission. Additionally or alternatively, the UE 115 may transmit uplink scheduling feedback or CSI feedback during the CET. In another example, a UE 115 may report control information quasi-periodically. For instance, the UE 115 may receive scheduling for CSI reporting from a base station 105. The scheduling may designate, to the UE 115, specified intervals (e.g., specific TTI, subframe, etc.) and a control feedback window for reporting control information (e.g., CSI). The window may provide a duration prior and subsequent to the specified interval during which a UE 115 may transmit control information. For example, the UE 115 may perform a CCA reserving the channel for a duration that does not include the specified interval but may transmit feedback information based on determining the specified interval falls within the assigned window. In some cases, the report may be transmitted prior or subsequent to the scheduled interval.

Figure 2:
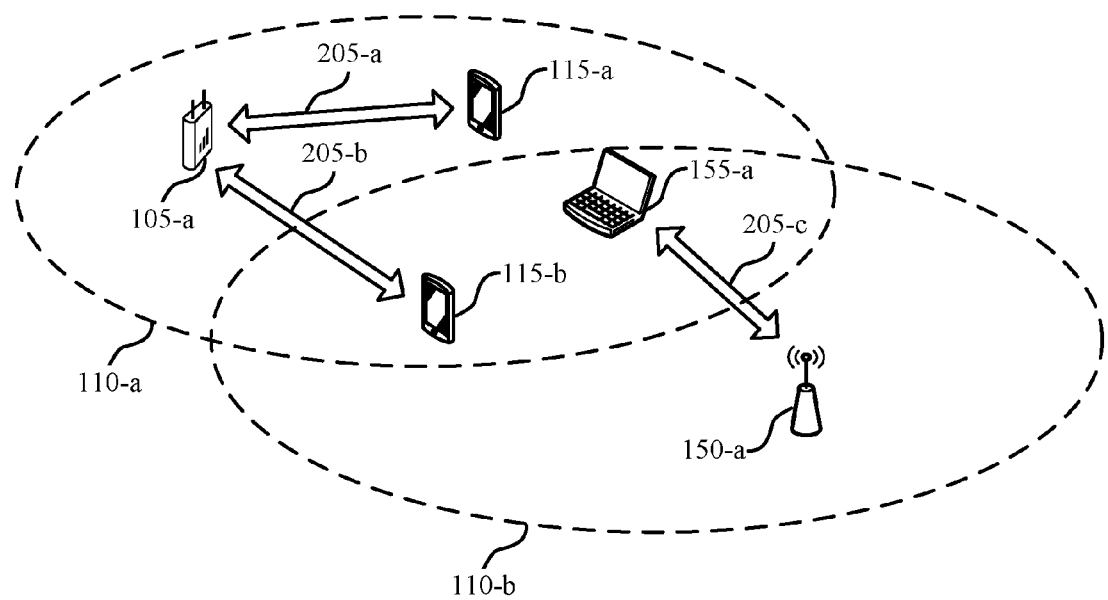
FIG. 2 illustrates an example of a wireless communication subsystem for channel feedback reporting for CCs (e.g., eCC in standalone operation, etc.) in accordance with various aspects of the present disclosure.

FIG. 2 illustrates an example of a wireless communications subsystem 200 for channel feedback reporting for shared frequency spectrum in accordance with various aspects of the present disclosure. Channel feedback reporting may include ACK/NACK and CSI reports. Wireless communications subsystem 200 may include UE 115-a, UE 115-b, base station 105-a, STA 155-a, and AP 150-a which may be examples of a UE 115 base station 105, STA 155, or AP 150 described above with reference to FIG. 1. Base station 105-a may communicate with UEs 115-a and 115-b via communication links 205-a and 205-b, respectively, when UEs 115-a and 115-b are within coverage area 110-a, while STA 155-a and AP 150-a may communicate with one another via communication link 205-c when STA 155-a is within coverage area 110-b as generally described above with reference to FIG. 1. Communication links 205-a, 205-b may use LTE/LTE-A CCs or eCCs operating over a same frequency band of unlicensed or shared spectrum (e.g., in a standalone mode) as communication link 205-c.

In one example, base station 105-a may establish connections with UE 115-a and UE 115-b. Base station 105-a may send CSI reporting configuration information to both UE 115-a and UE 115-b that indicates a reporting schedule according to which UE 115-a and UE 115-b should report control information (e.g., CSI, etc.) to base station 105-a. Base station 105-a may additionally send a control feedback window to UE 115-a and UE 115-b designating time thresholds prior and/or subsequent to specified reporting TTIs (e.g., subframes, symbols, etc.) for which quasi-periodic CSI reporting is configured.

Base station 105-a may perform a successful CCA and begin transmitting on the downlink. The transmission may include a preamble to clear the channel in addition to subsequent control and user data. The preamble may include a preamble that indicates a downlink and uplink configuration for subsequent TTIs to UE 115-a and UE 115-b. UE 115-a and UE 115-b may monitor the downlink transmission for incoming data and may also use received reference signals (RSs) (e.g., CRS, CSI-RS, UE-RS, etc.) to generate channel estimates and CSI feedback.

In some cases, both UE 115-a and UE 115-b may be scheduled to report at respective TTIs within a time period of designated uplink TTIs. UE 115-a and UE 115-b may each perform CCA procedures in an attempt to win the channel during the uplink TTIs. In some cases, the CCA for UE 115-a may be successful and the CCA for UE 115-b may fail (e.g., upon initiation of the transmission by UE 115-a). After winning the channel, UE 115-a may transmit the CSI report during the first TTI following the CCA. In some cases, the scheduled TTI assigned to UE 115-a for CSI reporting may be prior or subsequent to the first TTI, but may fall within the designated window. After UE 115-a finishes reporting the CSI information (which may or may not be accompanied by transmission of other data), or after the base station performs a second successful CCA and downlink transmission, UE 115-b may be able to successfully perform a CCA. Upon the successful CCA, UE 115-b may transmit CSI information to base station 105-a. Although the CSI report may not be transmitted using the assigned TTI, base station 105-a may monitor for CSI transmissions from UEs 115-a and 115-b during the uplink TTIs and may identify CSI reports based on UE-specific transmission information. For instance, base station 105-a may identify CSI reports based on the frequency resources, MCS, or the sequence used for the transmission. The quasi-periodic CSI transmissions may be synchronous (e.g., aligned in time to the eCC symbol periods) or asynchronous.

In another example, base station 105-a may configure UE 115-a and UE 115-b for fast feedback reporting. In some cases, base station 105-a may transmit a message, which may be included in a preamble, that enables fast feedback of control information for UE 115-a and UE 115-b. For instance, base station 105-a may indicate to UE 115-a and UE 115-b to utilize CETs for control feedback. Base station 105-a may perform a successful CCA and transmit a preamble including transmission information (e.g., duration, an UL-DL configuration for the transmission resources, etc.) for the associated transmission. In some cases, the base station 105-a may designate certain uplink symbols as CET resources. Each UE 115-a and UE 115-b may be designated distinct frequency or time resources of a control channel structure for CET transmissions (e.g., configured in the preamble, in RRC configuration, based on UE-ID, etc.). Base station 105-a may begin transmitting downlink information to UEs within coverage area 110-a including UE 115-a and UE 115-b. As mentioned above, the downlink transmission may include reference signals for channel estimation. After the base station 105-a finishes transmitting downlink information, UE 115-a and UE 115-b may transmit control feedback (e.g., ACK/NACK, CSI) using CETs to base station 105-a. In some cases, the control information for multiple UEs 115 may be included within the same set of symbols (e.g., using non-overlapping or interleaved frequency resources, etc.) associated with a CET transmission. In other cases, UE 115-a may transmit in a first set of CET symbols and UE 115-b may transmit in a second, subsequent set of CET symbols.

Base station 105-a may receive the fast feedback including CSI and ACK/NACK reports. The CSI report may include CQI and/or delta CQI, which may be referenced to the MCS used by the base station 105-a for previous PDSCH transmission. The CSI may be generated using references signals (e.g., CRS with precoding applied or DM-RS associated with the previous PDSCH. In some cases, the fast feedback may include PMI or RI indicators. Additionally or alternatively, UE 115-a or UE 115-b may include CQI for regions outside of the decoded PDSCH. Base station 105-a may use fast feedback to adapt the MCS for subsequent DL transmissions. Fast feedback may enable wireless communications subsystem 200 to perform fast link adaptation and increase the throughput of the network.

In another example, a base station 105-a may send a request for an aperiodic CSI report from UE 115-a. In some examples, the report may be triggered by setting the CQI request field in an downlink control information (DCI) message. The request may indicate a set of channels (e.g., one or more 20 MHz channels) for which UE 115 may generate a CSI report. Unlike licensed spectrum where CRSs and/or CSI-RSs are present on semi-statically configured periodic time and frequency locations, reference signals may only be dynamically available (e.g., based on the base station clearing CCA, etc.). In some cases, base station 105-a may send the CSI-RSs on demand, that is, base station 105-a sends the CSI-RSs only on the subframes in which base station 105-a sends the aperiodic feedback request. The base station 105-a may signal the presence of CSI-RSs in downlink grants so that other UEs 115 may perform PDSCH rate matching. For example, where the base station 105-a sends a data transmission to UE 115-b during a subframe which includes an aperiodic CSI request for UE 115-a, the base station 105-a may indicate to UE 115-b that CSI-RSs are present in the data transmission.

UE 115-a may compute CSI for the designated channels using the transmitted CRSs or CSI-RSs. UE 115-a may transmit the aperiodic CSI report to base station 105-a using the PUSCH. The CSI report may include CSI for a set of channels (e.g., N*20 MHz) or a subset of the set of channels. The aperiodic CSI may be computed based on the latest received reference signal, which may be the reference signals in the DL burst with the aperiodic CSI trigger, or for a channel where base station 105-a could not clear the channel using CCA, the latest instance of reference signals according to a discovery reference signal (DRS) configuration. In some cases, base station 105-a may transmit reference signals using a common transmit power for narrow and wideband transmissions. Therefore, the power spectral density (PSD) associated with the wider band transmission may be decreased when compared to narrow band transmissions. In some cases, UE 115-a may determine the PSD of the reference signals based on the transmission bandwidth (e.g., 20, 40, 60, 80 Mhz, etc.). In some cases, UE 115-a may develop a CSI report based on the determined PSD.

Figure 3A:
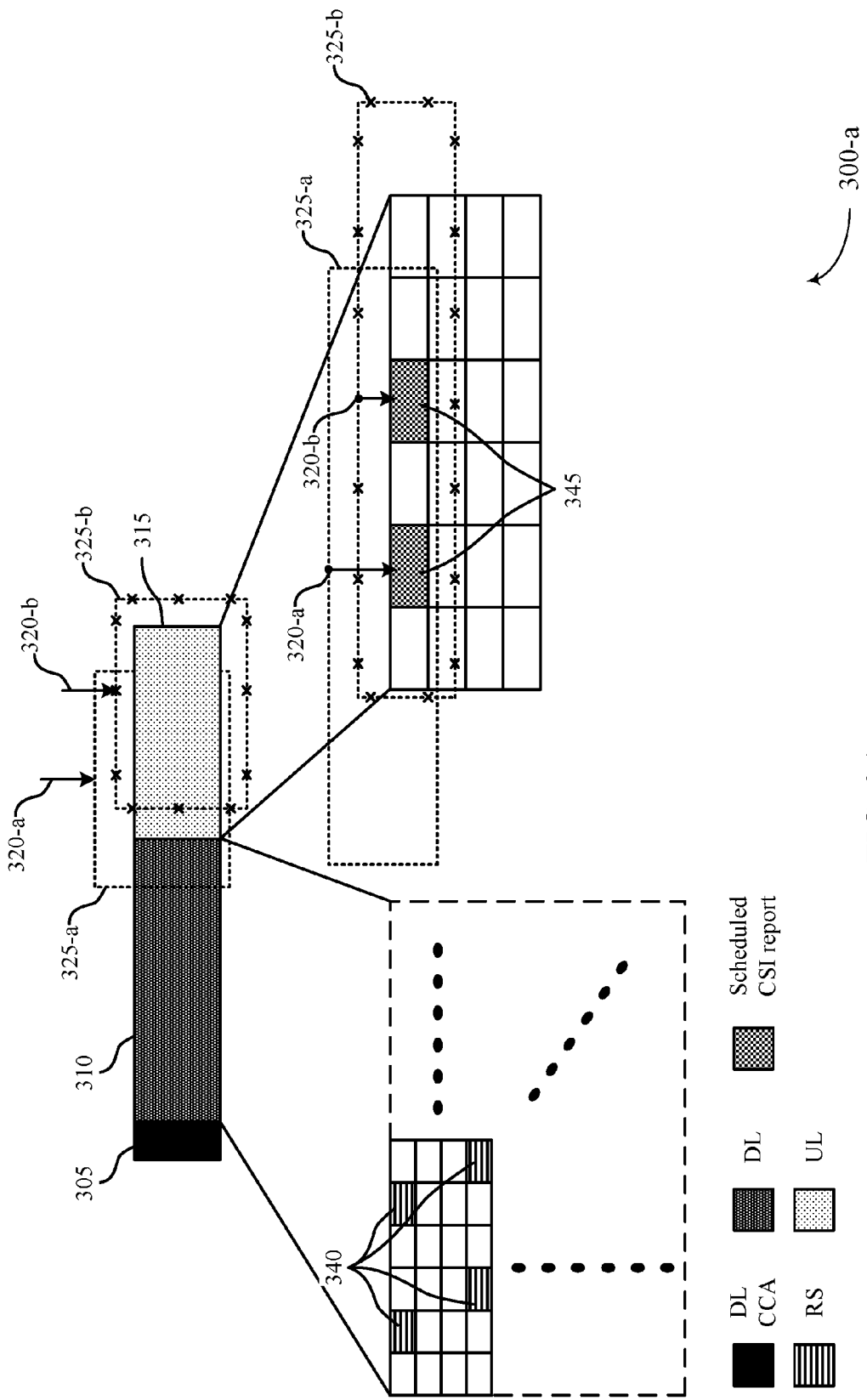
FIG. 3A illustrates an example of an eCC transmission scheme for channel feedback reporting for CCs (e.g., eCC in standalone operation, etc.) in accordance with various aspects of the present disclosure.

FIG. 3A illustrates an example of a transmission scheme 300-a for channel feedback reporting for shared frequency spectrum in accordance with various aspects of the present disclosure. Channel feedback reporting may include ACK/NACK and CSI reports. Transmission scheme 300-a may illustrate aspects of a communication session between a UE 115 and a base station 105, as described above with reference to FIGS. 1-2. Transmission scheme 300-a may include CCA 305 performed by base station 105, DL TTIs 310, and UL TTIs 315. DL TTIs 310 may include RSs 340. Periodic CSI reporting TTIs, CSI_UE1 320-a and CSI_UE2 320-b, may be determined according to periodic CSI configurations for a first UE 115 and a second UE 115, respectively. The first and second UEs 115 may also be configured with quasi-periodic control feedback windows 325-a and 325-b, respectively. The UL TTIs 315 may include scheduled CSI resources 345 corresponding to the configured periodic CSI reporting intervals, in some cases.

In one example, base station 105 may transmit scheduling information to one or more UEs 115 indicating an interval where a UE 115 may transmit CSI. At a later point in time, the base station 105 may perform a successful CCA 305 and take control of a shared channel. The base station 105 may then transmit a preamble reserving the channel and indicating an uplink and downlink configuration. The base station 105 may begin DL TTIs 310 which may include RSs 340 (e.g., CRS, UE-RS, CSI-RS, etc.). The UEs 115 may use the RSs 340 to generate channel estimates and to develop CSI reports. One or more UEs 115 may be scheduled to transmit CSI feedback at periodic CSI reporting TTIs 320.

The first UE 115 may perform a successful CCA during quasi-periodic control feedback window 325-a and transmit the CSI report. The CSI report may be transmitted synchronously (e.g., aligned to one or more TTIs following the CCA), or asynchronously, in some cases.

As mentioned above, because UEs 115 may perform an LBT procedure prior to transmitting uplink information during the UL TTIs 315, performing the LBT procedure only for time periods associated with the scheduled CSI resources 345 may reduce the probability of winning the channel for a successful CSI feedback transmission. Thus, the UE 115 may fail to transmit the periodic CSI report for the particular periodic CSI interval, despite the presence of available transmission resources earlier or later during UL TTIs 315. Therefore, a quasi-periodic control feedback window 325 may be configured to enable a UE 115 to transmit prior or subsequent to the scheduled periodic CSI reporting TTI 320. In one case, a UE 115 may transmit CSI information in the first TTI following a successful CCA. Initiating the LBT transmission procedure at the beginning of configured UL TTIs 315 may significantly increase the probability of a successful CCA for transmitting the CSI report during UL TTIs 315. In one example, quasi-periodic control feedback windows may be implicitly defined as all the uplink TTIs reserved by the base station that contain the periodic CSI reporting TTI. In another example, quasi-periodic control feedback windows may be implicitly defined as all the consecutive uplink TTIs reserved by the base station that contain the periodic CSI reporting TTI. In yet another example, quasi-periodic control feedback windows may be implicitly defined by uplink TTIs (consecutive or non-consecutive) within a predetermined number of TTIs of the periodic CSI reporting TTI.

Figure 3B:
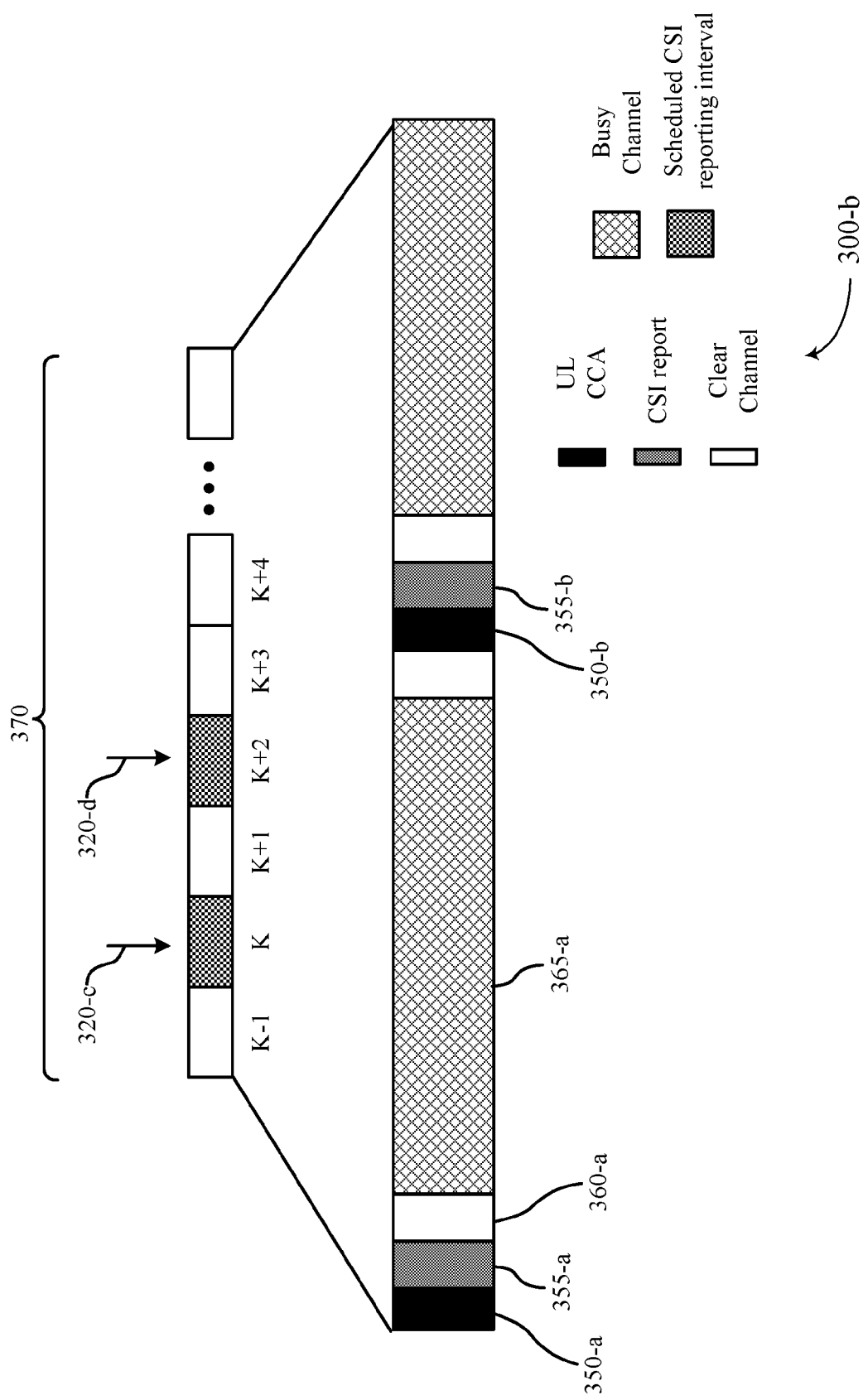
FIG. 3B illustrates an example of an eCC uplink transmission for channel feedback reporting for CCs (e.g., eCC in standalone operation, etc.) in accordance with various aspects of the present disclosure.

FIG. 3B illustrates an example of an uplink transmission 300-b for channel feedback reporting for shared frequency spectrum in accordance with various aspects of the present disclosure. Channel feedback reporting may include ACK/NACK and CSI reports. Uplink transmission 300-b may illustrate aspects of a communication session between a UE 115 and a base station 105, as described above with reference to FIGS. 1-3A. Uplink transmission 300-b may include uplink TTIs 370. Uplink TTIs 370 may include six uplink TTIs, including TTIs overlapping with periodic CSI reporting TTIs CSI_UE1 320-c and CSI_UE2 320-d. An expanded view of UL TTIs 315-a may illustrate LBT channel feedback procedures for multiple UEs. The LBT procedure may include CCA_UE1 350-a and CCA_UE2 350-b, which may be followed by CSI report 355-a and CSI report 355-b, respectively.

In one example, first and second UEs 115 (e.g., UE1 and UE2) may be scheduled to report CSI during uplink TTIs 370. The first UE 115 may be scheduled to report during uplink TTI K and the second UE 115 may be scheduled to report during uplink TTI K+2. Each UE 115 may determine that its respective reporting interval CSI_UE1 320-c or CSI_UE2 320-c is scheduled within uplink TTIs 370. Accordingly, both UEs 115 may perform a CCA in an attempt to win the channel. The first UE 115 may perform successful CCA_UE1 350-a may reserve the channel for a duration based on the amount of data ready for transmission to base station 105. Based on identifying that TTI K is within the quasi-periodic control feedback window, the first UE 115 may transmit a CSI report 355-a in the TTI following CCA_UE1 350-a. The first UE 115 may additionally transmit other data for the remainder of the channel reservation. In one example, uplink transmissions for the first UE 115 are complete after the CSI report 355-a is sent and the channel is clear during clear channel interval 360-a. During clear channel interval 360-a, other UEs 115, including the second UE 115, or STAs 110 may perform CCAs and begin uplink transmissions during busy channel interval 365-a. At a later point in time, the second UE 115 may perform a successful CCA_UE2 350-b. In the following TTI, the second UE 115 may transmit CSI report 355-b, which may be prior to, subsequent to, or during TTI K+2. The remainder of the uplink TTIs 370 may be used by other UEs 115 for uplink transmissions.

Figure 4A:
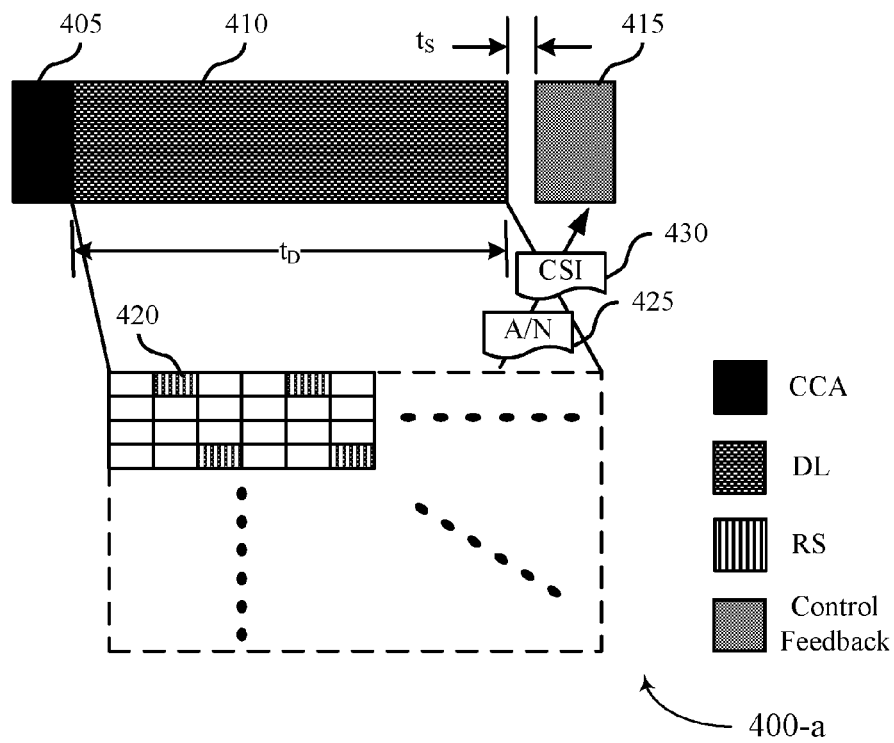
FIGS. 4A and 4B illustrate examples of an eCC fast feedback transmission scheme for channel feedback reporting for CCs (e.g., eCC in standalone operation, etc.) in accordance with various aspects of the present disclosure.

FIG. 4A illustrates an example of a fast feedback transmission scheme 400-a for channel feedback reporting for CCs (e.g., eCC in standalone operation, etc.) in accordance with various aspects of the present disclosure. Channel feedback reporting may include ACK/NACK, uplink scheduling information, and CSI reports. Fast feedback transmission scheme 400-a may illustrate aspects of a communication session between a UE 115 and a base station 105, as described above with reference to FIGS. 1-3B. Fast feedback transmission scheme 400-a may include a CCA 405, DL data transmission 410, and UL control channel transmission 415. The UE 115 may generate ACK/NACK information 425 for data received on DL data transmission 410 and may include the ACK/NACK information 425 in UL control channel transmission 415. The DL data transmission 410 may include RSs 420 which may be used by the UE 115 to generate a CSI report 430. Optionally, the CSI report 430 may also be included in UL control channel transmission 415.

In one example, a base station 105 may perform a successful CCA 405 and transmit a preamble indicating transmission information for the subsequent transmission interval (e.g., duration, TDD UL-DL configuration, etc.). The base station 105 may begin DL data transmission 410 which may include data intended for multiple UEs 115 and reference signals, including RSs 420. The UEs 115 may generate ACK/NACK information 425 based on whether the received data blocks have been correctly decoded. The UEs 115 may also use the RSs 420 to generate CSI report 430. In one example, base station 105 may transmit downlink data (e.g., code-words, etc.) within duration $t_D$ to the designated UEs 115 and stop transmitting. The UEs 115 may wait an interval is after the completion of DL data transmission 410 and may then begin UL control channel transmissions 415. The interval is may be shorter than the CCA duration and may be a time period associated with the eCC (e.g., an eCC symbol period), or may be skipped (e.g., no delay prior to UL control channel transmission 415), in some cases. During the control channel transmissions, the UEs 115 may transmit ACK/NACK information 425 to the base station 105 without performing a CCA. If the data transmission included in DL data transmission 410 for a particular UE 115 decodes in error, the UE 115 may send an explicit NACK in the UL control channel transmission 415. In some cases, the UEs 115 may include CSI report 430 with the ACK/NACK information. In some cases, each UE 115 may be designated non-interfering time or frequency resources for uplink reporting (e.g., separate time-frequency blocks, interleaved frequency resources, etc.). For instance, a first set of UEs 115 may transmit on interleaved frequency resources during a first set of symbols, while a second set of UEs 115 may transmit on interleaved frequency resources during a second, subsequent set of symbols. The CSI report may include CQI, PMI, RI, etc.

The control information (e.g., ACK/NACK, CSI, uplink resource request, etc.) transmitted in UL control channel transmission 415 may be mapped to resources of a dedicated control channel structure. For example, the control information may be coded or replicated to generate N modulation symbols, and the N modulation symbols may be modulated using N sequences of M symbols to generate N sequences of M modulated control information symbols that are mapped to specific time-frequency resources of the control channel structure. For example, ACK/NACK, CSI, and uplink resource request information may be mapped to designated portions of the control channel structure. In some examples, the control channel structure may correspond to a control channel TTI including a predetermined number of eCC symbol periods (e.g., 1, 2, 4, 8, etc.). Each UE may have designated frequency resources (e.g., contiguous subcarriers, interleaved subcarriers, etc.) within the control channel TTI, which may be determined implicitly (e.g., based on information in the DL grant) or explicitly (e.g., based on UE-ID or configured using higher layers, etc.).

Figure 4B:
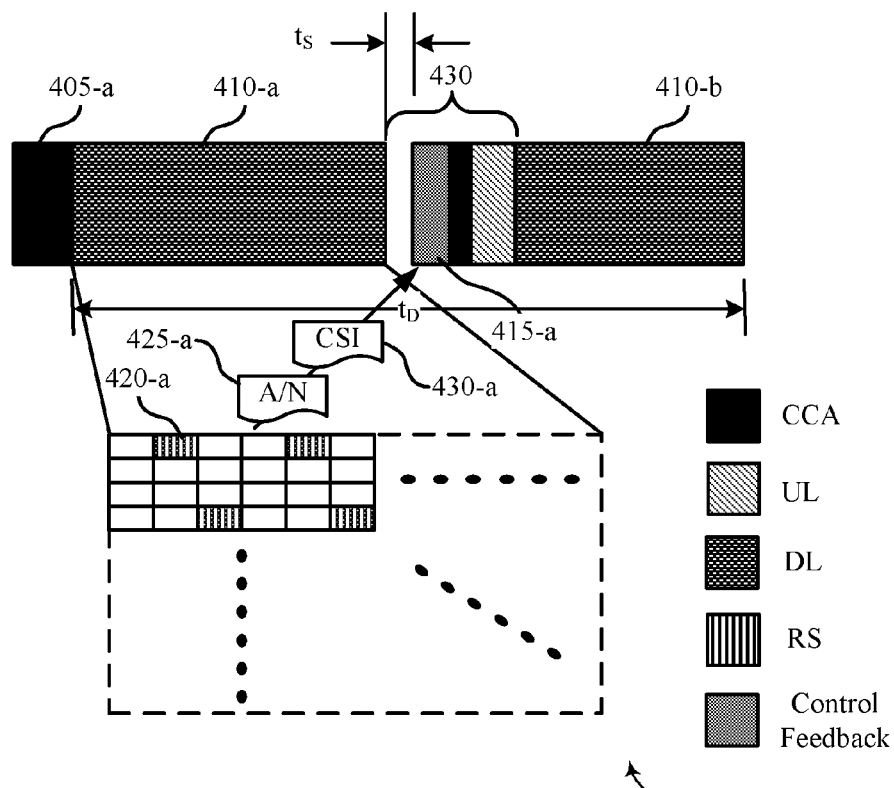

FIG. 4B illustrates an example of a fast feedback transmission scheme 400-b for Channel feedback reporting for shared frequency spectrum in accordance with various aspects of the present disclosure. Channel feedback reporting may include ACK/NACK and CSI reports. Fast feedback transmission scheme 400-b may illustrate aspects of a transmission between a UE 115 and a base station 105, as described above with reference to FIGS. 1-3B. Fast feedback transmission scheme 400-b may include a DL CCA 405-a, DL data transmissions 410-a and 410-b, and UL control channel transmission 415-a. The UE 115 may generate ACK/NACK information 425-a for data received in DL data transmission 410-a and may include the ACK/NACK information 425-a in UL control channel transmission 415-a. The DL data transmission 410-a may include RSs 420-a which may be used by a UE 115 to generate a CSI report 430-a. The CSI report 430-a may also be included in UL control channel transmission 415-a.

In one example, the base station 105 may indicate an uplink and downlink configuration that includes uplink TTIs 435 between two sets of downlink TTIs. Similar to the above technique, a set of UEs 115 may wait an interval is before transmitting UL control channel transmission 415-a, which may include ACK/NACK information 425-a. In some cases, the UEs 115 may include a CSI report 430-a with the ACK/NACK information. In some cases, each UE 115 may determine which time and frequency resources will be used by the other UEs 115 for CET transmissions and transmit accordingly. In other cases, a base station 105 may designate to the UEs 115 distinct, non-interfering time and frequency resources for CET transmissions. At the completion of uplink TTIs 435, the base station 105 may continue DL data transmissions 410-b.

Figure 5:
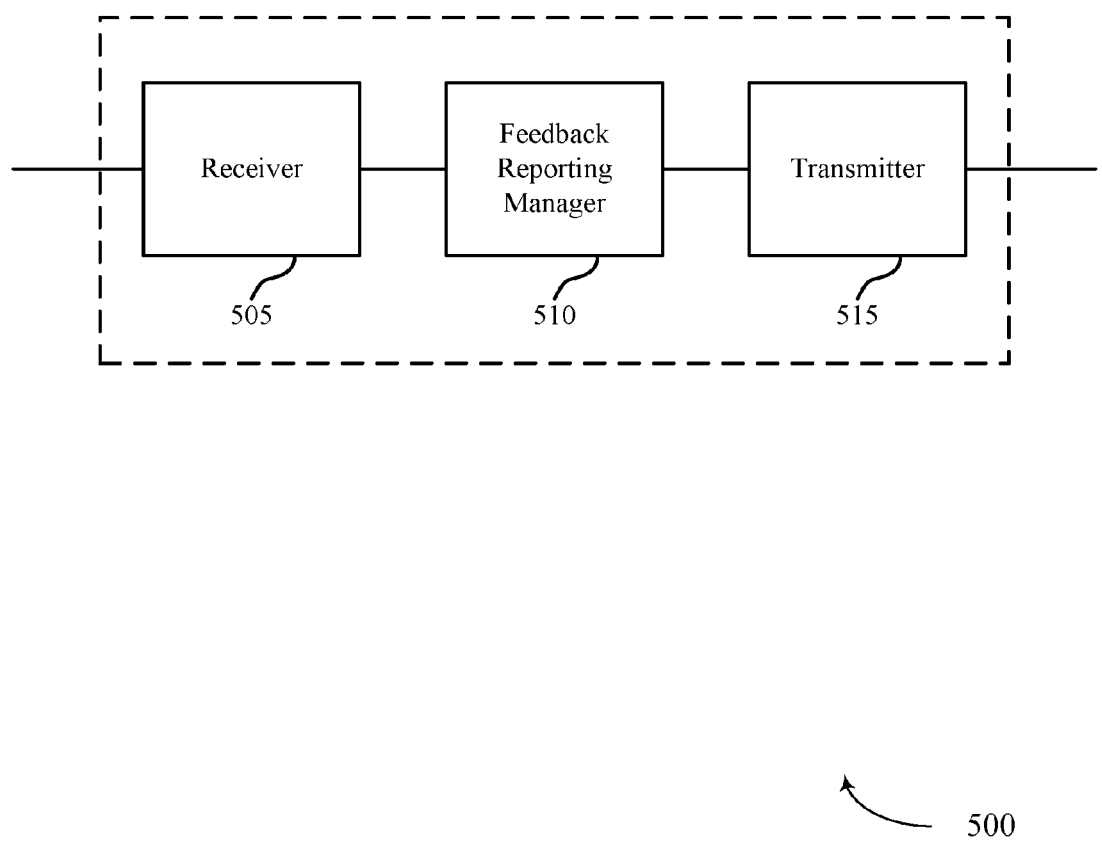
FIGS. 5-7 show block diagrams of a wireless device that supports feedback reporting for eCCs in accordance with various aspects of the present disclosure.

FIG. 5 shows a block diagram of a wireless device 500 configured for channel feedback reporting for shared frequency spectrum in accordance with various aspects of the present disclosure. Wireless device 500 may be an example of aspects of a UE 115 or base station 105 described with reference to FIGS. 1-4. Wireless device 500 may include a receiver 505, a feedback reporting manager 510, or a transmitter 515. Wireless device 500 may also include a processor. Each of these components may be in communication with each other.

The receiver 505 may receive information such as packets, user data, or control information associated with various information channels (e.g., control channels, data channels, and information related to CQI feedback reporting for eCC, etc.). Information may be passed on to the feedback reporting manager 510, and to other components of wireless device 500. In some examples, the receiver 505 may receive a data transmission from the eNB over the CC.

The feedback reporting manager 510 may communicate with an eNB using a CC over a shared frequency band, receive a data transmission from the eNB over the CC, determine ACK/NACK information for the data transmission, and transmit the ACK/NACK information in a CCA exempt feedback transmission to the eNB via the CC, wherein the ACK/NACK information is mapped to designated resources of an uplink control channel structure for the CCA-exempt feedback transmission. In some cases, the uplink control channel structure may comprise a subset of frequency resources of the CC.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas. In some examples, the transmitter 515 may transmit the ACK/NACK information in a CCA exempt feedback transmission to the eNB via the CC, wherein the ACK/NACK information is mapped to designated resources of an uplink control channel structure for the CCA-exempt feedback transmission. In some examples, the transmitter 515 may transmit, in the CCA-exempt feedback transmission, the uplink scheduling feedback or the CSI feedback. In some examples, the transmitted CSI feedback comprises an indicator associated with the target MCS. In some examples, the indicator associated with the target MCS comprises the channel quality delta. In some examples, the start of the CCA-exempt feedback transmission occurs less than a predetermined CCA time period from an end of the data transmission. In some examples, the first CSI feedback comprises a wideband channel quality for a frequency range spanning the one or more channels.

Figure 6:
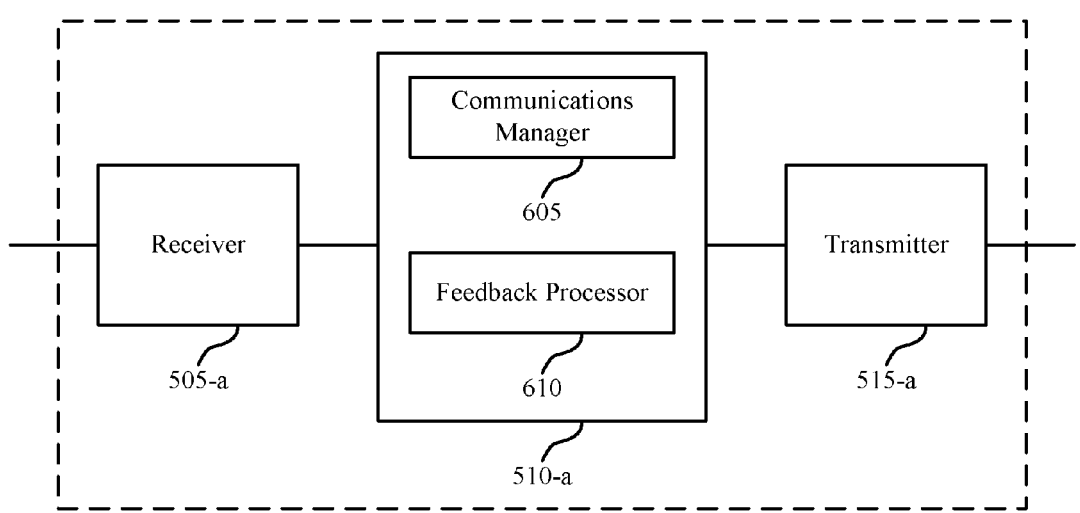

FIG. 6 shows a block diagram of a wireless device 600 for channel feedback reporting for CCs (e.g., eCC in standalone operation, etc.) in accordance with various aspects of the present disclosure. Wireless device 600 may be an example of aspects of a wireless device 500, a UE 115, or a base station 105 described with reference to FIGS. 1-5. Wireless device 600 may include a receiver 505-a, a feedback reporting manager 510-a, or a transmitter 515-a. Wireless device 600 may also include a processor. Each of these components may be in communication with each other. The feedback reporting manager 510-a may also include a communications manager 605, and a feedback processor 610.

The receiver 505-a may receive information which may be passed on to feedback reporting manager 510-a, and to other components of wireless device 600. The feedback reporting manager 510-a may perform the operations described with reference to FIG. 5. The transmitter 515-a may transmit signals received from other components of wireless device 600.

The communications manager 605 may manage communications with an eNB using a CC over a shared frequency band as described with reference to FIGS. 2-4. The communications manager 605 may also identify a transmission, from the eNB, reserving one or more channels of the shared frequency band for communication via the CC, the transmission identifying a TDD configuration for the CC over a specified time duration. The CC may include an eCC configured for the UE in a standalone operation mode as described with reference to FIGS. 2-4.

The feedback manager 610 may determine ACK/NACK information for the data transmission as described with reference to FIGS. 2-4. The feedback processor 610 may also determine uplink scheduling feedback or CSI feedback. The feedback processor 610 may also receive a feedback configuration for providing feedback for transmissions via the CC, wherein the feedback configuration indicates providing the feedback in the CCA-exempt feedback transmission, a CCA-compliant feedback transmission, or combinations thereof. The feedback processor 610 may also determine an uplink transmission window of one or more uplink transmission windows during the specified time duration for transmitting the first CSI feedback based at least in part on a timing characteristic of the uplink transmission window relative to the identified TTI. The feedback processor 610 may also perform a CSI feedback transmission procedure to transmit the first CSI feedback during the uplink transmission window. In some examples, the CSI feedback transmission procedure comprises transmitting the first CSI feedback upon a successful reservation of the one or more channels based at least in part on the first CCA-compliant feedback transmission procedure. In some examples, the timing characteristic comprises the uplink transmission window being within a time threshold of the identified TTI. In some examples, the timing characteristic comprises the uplink transmission window including the identified TTI. In some cases, CSI feedback transmissions may be aligned with a frame, subframe, or symbol boundary. In other cases, the CSI feedback may be transmitted asynchronously with radio boundaries.

Figure 7:
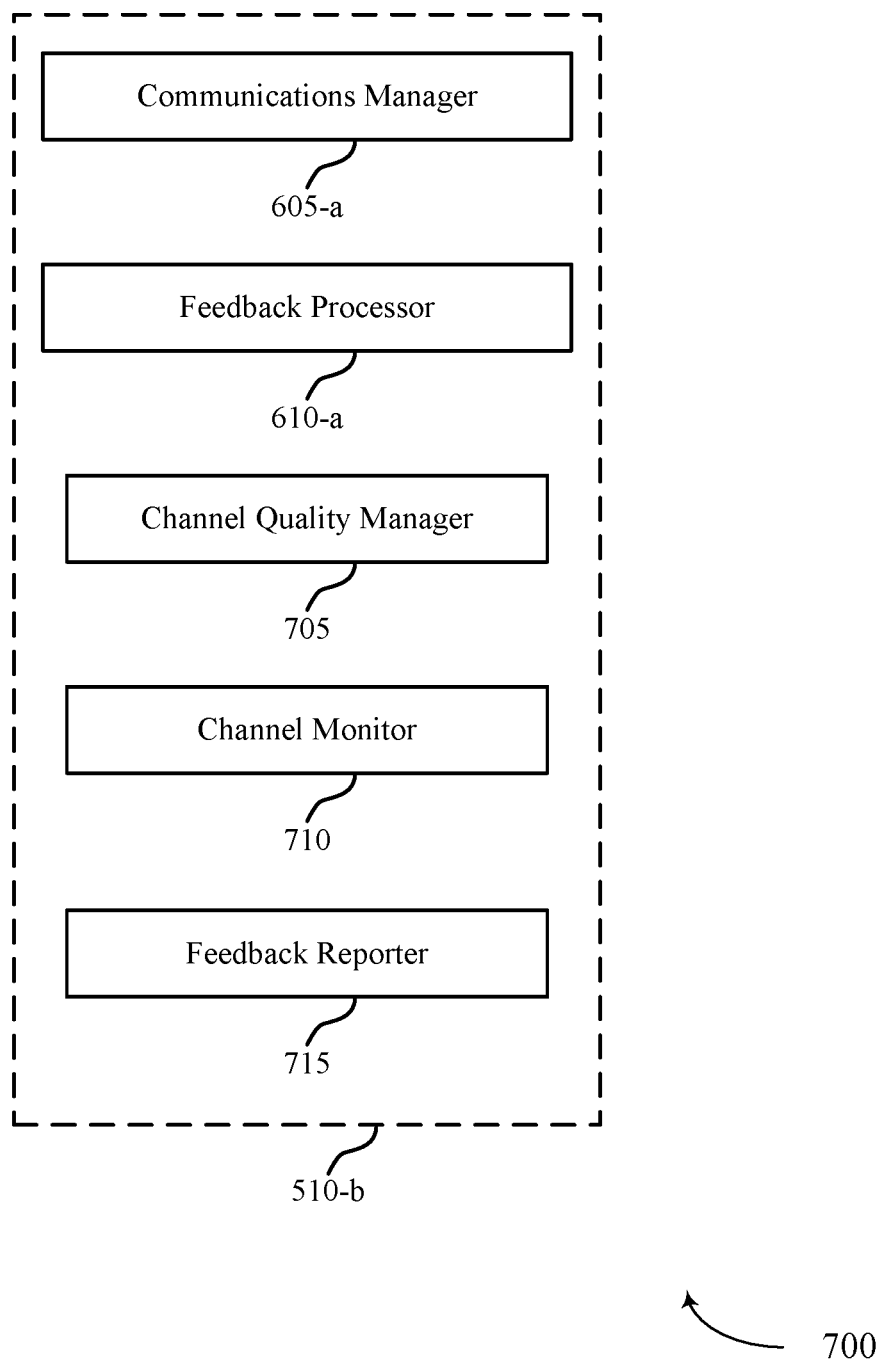

FIG. 7 shows a block diagram 700 of a feedback reporting manager 510-b which may be a component of a wireless device 500 or a wireless device 600 for channel feedback reporting for CCs (e.g., eCC in standalone operation, etc.) in accordance with various aspects of the present disclosure. The feedback reporting manager 510-b may be an example of aspects of a feedback reporting manager 510 described with reference to FIGS. 5-6. The feedback reporting manager 510-b may include a communications manager 605-a, and a feedback processor 610-a. Each of these modules may perform the functions described with reference to FIG. 6. The feedback reporting manager 510-b may also include a channel quality manager 705, a channel monitor 710, and a feedback reporter 715.

The channel quality manager 705 may determine a target MCS for a subsequent data transmission based at least in part on channel measurements of one or more reference signals associated with the data transmission as described with reference to FIGS. 2-4. The channel quality manager 705 may also determine a channel quality delta between the current MCS and the target MCS. In some examples, the one or more reference signals comprise any of a CRS, a DM-RS, a UE-RS, or combinations thereof. In some examples, the determining the target MCS for the subsequent data transmission comprises estimating a quality of a channel from the eNB based at least in part on the CRS and the current precoding matrix. In some examples, the determining the target MCS for the subsequent data transmission comprises estimating a quality of a channel from the eNB based at least in part on the CRS and hypothetical candidate precoding matrices. The channel quality manager 705 may also perform channel measurements for the one or more channels based at least in part on the cyclical transmission pattern.

The channel monitor 710 may identify a current MCS for the data transmission as described with reference to FIGS. 2-4. In some examples, the CSI feedback transmission procedure comprises determining that the one or more channels are busy during the first uplink TTI based at least in part on the first CCA-compliant feedback transmission procedure. The channel monitor 710 may also identify a DRS configuration for the CC, the DRS configuration indicating a cyclical transmission pattern for reference signals transmitted in the one or more channels. The channel monitor may additionally identify a TTI associated with transmitting first CSI feedback for a CC operating in a standalone operation mode over a shared frequency band based at least in part on a CSI feedback configuration.

The feedback reporter 715 may be configured such that the CSI feedback transmission procedure may include performing a first CCA-compliant feedback transmission procedure over the one or more channels during a first uplink TTI of the uplink transmission window as described with reference to FIGS. 2-4. In some examples, the CSI feedback transmission procedure comprises performing a second CCA-compliant feedback transmission procedure over the one or more channels during a second, subsequent uplink TTI of the uplink transmission window. In some cases, the feedback reporter 715 may configured to report CSI feedback using resources that are distinct and non-interfering with other devices transmitting CSI reports.

Figure 8:
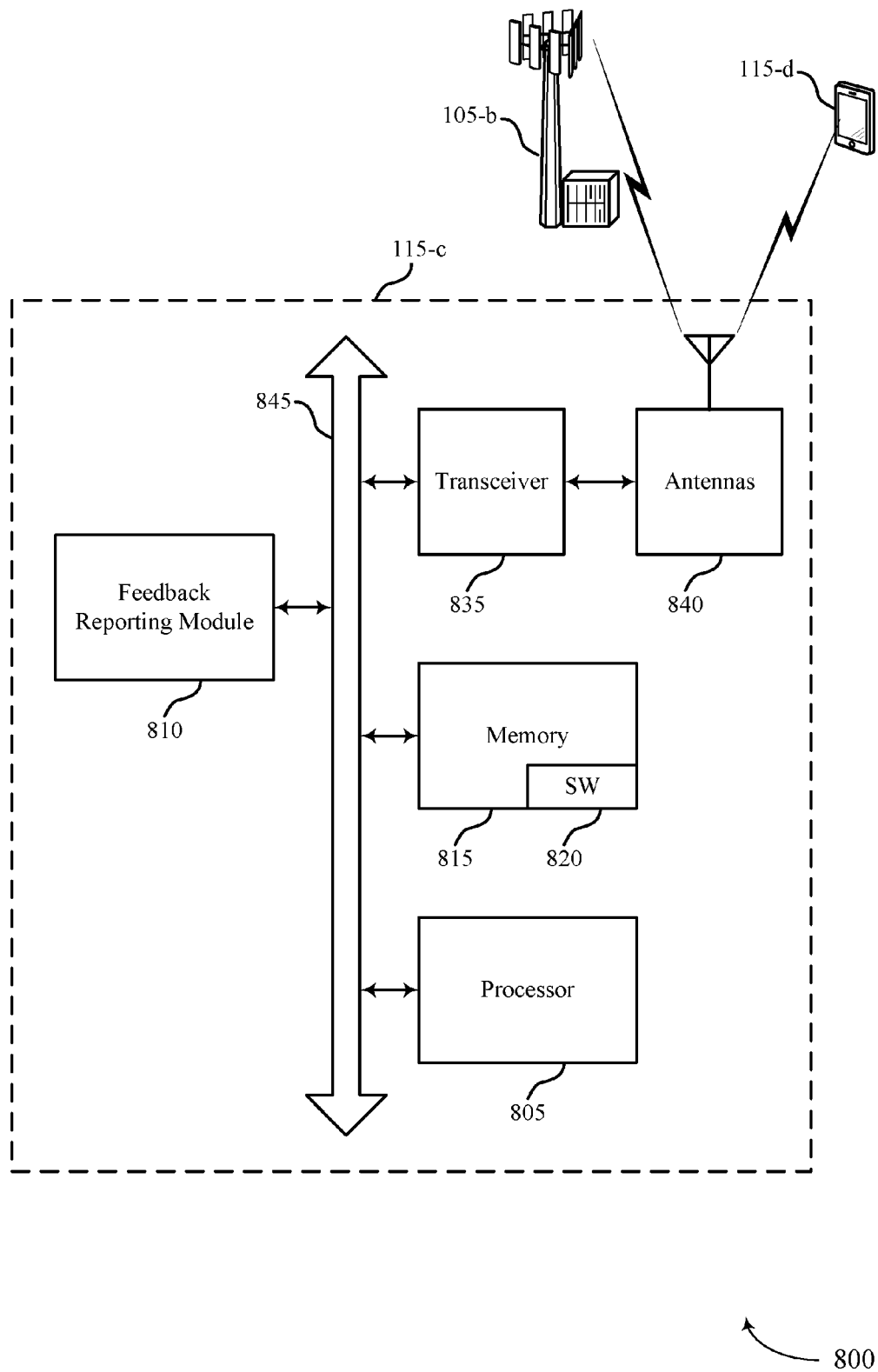
FIG. 8 illustrates a block diagram of a system including a device that supports feedback reporting for eCCs in accordance with various aspects of the present disclosure.

FIG. 8 shows a diagram of a system 800 including a UE 115-c configured for channel feedback reporting for CCs (e.g., eCC in standalone operation, etc.) in accordance with various aspects of the present disclosure. System 800 may include UE 115-c, which may be an example of a wireless device 500, a wireless device 600, a UE 115, or a base station 105 described with reference to FIGS. 1, 2 and 5-7. UE 115-c may include a feedback reporting module 810, which may be an example of a feedback reporting manager 510 described with reference to FIGS. 5-7. UE 115-c may also include components for bi-directional voice and data communications including components for transmitting communications and components for receiving communications. For example, UE 115-c may communicate bi-directionally with base station 105-b or UE 115-d.

UE 115-c may also include a processor 805, and memory 815 (including software (SW)) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-c may include a single antenna 840, UE 115-c may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., CQI feedback reporting for eCC, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

Figure 9:
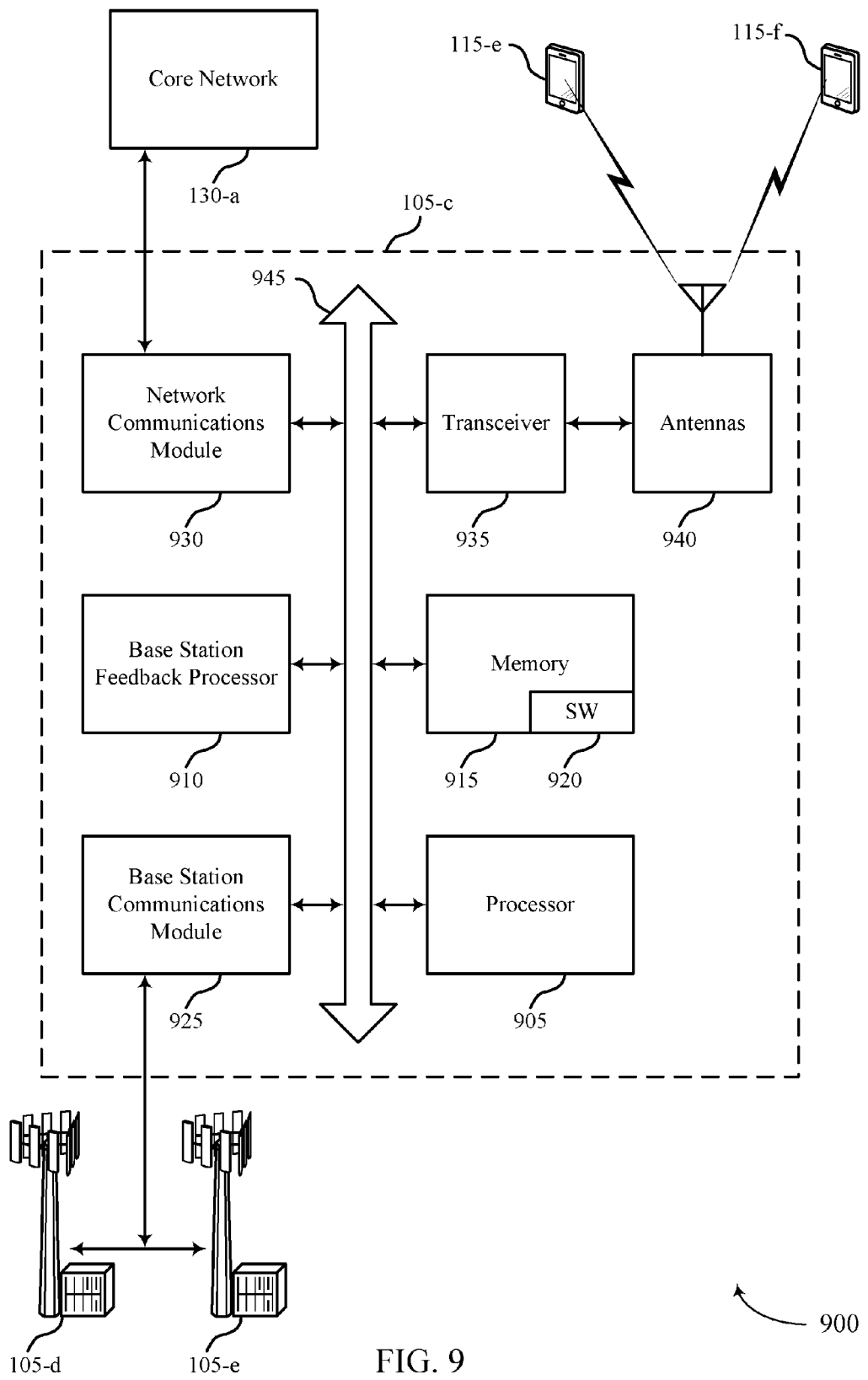
FIG. 9 illustrates a block diagram of a system including a base station that supports feedback reporting for eCCs in accordance with various aspects of the present disclosure.

FIG. 9 shows a diagram of a system 900 including a base station 105-c configured for managing and processing channel feedback for CCs (e.g., eCCs in standalone operation, etc.) in accordance with various aspects of the present disclosure. System 900 may include base station 105-c, which may be an example of a base station 105 described with reference to FIGS. 1, 2 and 6-8. Base station 105-c may configure UEs 115 for channel feedback reporting for CCs and process channel feedback received from UEs 115. For example, base station 105-c may determine transmission strategies, MCSs, and the like for future communications with UE 115 based on the channel feedback. Base station 105-c may also include components for bi-directional voice and data communications including components for transmitting communications and components for receiving communications. For example, base station 105-c may communicate bi-directionally with base station 105-d, base station 105-e, UE 115-e, or UE 115-f.

In some cases, base station 105-c may have one or more wired backhaul links. Base station 105-c may have a wired backhaul link (e.g., S1 interface, etc.) to the core network 130. Base station 105-c may also communicate with other base stations 105, such as base station 105-d and base station 105-e via inter-base station backhaul links (e.g., an X2 interface). Each of the base stations 105 may communicate with UEs 115 using the same or different wireless communications technologies. In some cases, base station 105-c may communicate with other base stations such as 105-d or 105-e utilizing base station communications module 925. In some examples, base station communications module 925 may provide an X2 interface within a Long Term Evolution (LTE)/LTE-A wireless communication network technology to provide communication between some of the base stations 105. In some examples, base station 105-c may communicate with other base stations through core network 130. In some cases, base station 105-c may communicate with the core network 130 through network communications module 930.

The base station 105-c may include a processor 905, a base station feedback processor 910, memory 915 (including software (SW) 920), transceiver 935, and antenna(s) 940, which each may be in communication, directly or indirectly, with one another (e.g., over bus system 945). The transceivers 935 may be configured to communicate bi-directionally, via the antenna(s) 940, with the UEs 115, which may be multi-mode devices. The transceiver 935 (or other components of the base station 105-c) may also be configured to communicate bi-directionally, via the antennas 940, with one or more other base stations (not shown). The transceiver 935 may include a modem configured to modulate the packets and provide the modulated packets to the antennas 940 for transmission, and to demodulate packets received from the antennas 940. The base station 105-*c* may include multiple transceivers 935, each with one or more associated antennas 940. The transceiver may be an example of a combined receiver 505 and transmitter 515 of FIG. 5.

The base station feedback processor 910 may be used to configure and support feedback reporting (e.g., in control information, etc.) as described with respect to FIGS. 2-8. For instance, the base station feedback processor 910 may be used to assign CSI reporting windows to a UE 115. In some cases, the base station feedback processor 910 may be used to schedule multiple UEs 115 for CSI reporting. For instance, the base station feedback processor 910 may be used to assign distinct, non-interfering time and frequency resources (e.g., separate time-frequency blocks, interleaved frequency resources, etc.) to a set of UEs 115. The assigned resources may be used for fast feedback by the UEs 115. For example, the UEs 115 may use this scheduling to coordinate CET transmission to base station 105-*c* as discussed with reference to FIGS. 4A and 4B. Furthermore, the base station feedback processor 910 may be used to transmit (e.g., via transceivers 935) aperiodic reporting trigger indicators and to map reference signals corresponding to the triggering. In some cases, the base station feedback processor 910 may transmit reference symbols semi-statically using configured periodic time and frequency locations. For instance, the reference signals may only be dynamically available based on base station transmissions for which a CCA is successful. In some cases, the base station feedback processor 910 may send CSI-RSs on subframes in which the base station feedback processor sends aperiodic feedback requests. The base station feedback processor 910 may signal the presence of CSI-RSs in downlink grants so that other UEs 115 may perform PDSCH rate matching.

The memory 915 may include RAM and ROM. The memory 915 may also store computer-readable, computer-executable software code 920 containing instructions that are configured to, when executed, cause the processor 905 to perform various functions described herein (e.g., CQI feedback reporting for eCC, selecting coverage enhancement techniques, call processing, database management, message routing, etc.). Alternatively, the software 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSPs), and the like.

The base station communications module 925 may manage communications with other base stations 105. In some cases, a communications management module may include a controller or scheduler for controlling communications with UEs 115 in cooperation with other base stations 105. For example, the base station communications module 925 may coordinate scheduling for transmissions to UEs 115 for various interference mitigation techniques such as beamforming or joint transmission.

The components of wireless device 500, wireless device 600, and feedback reporting manager 510-*b* may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
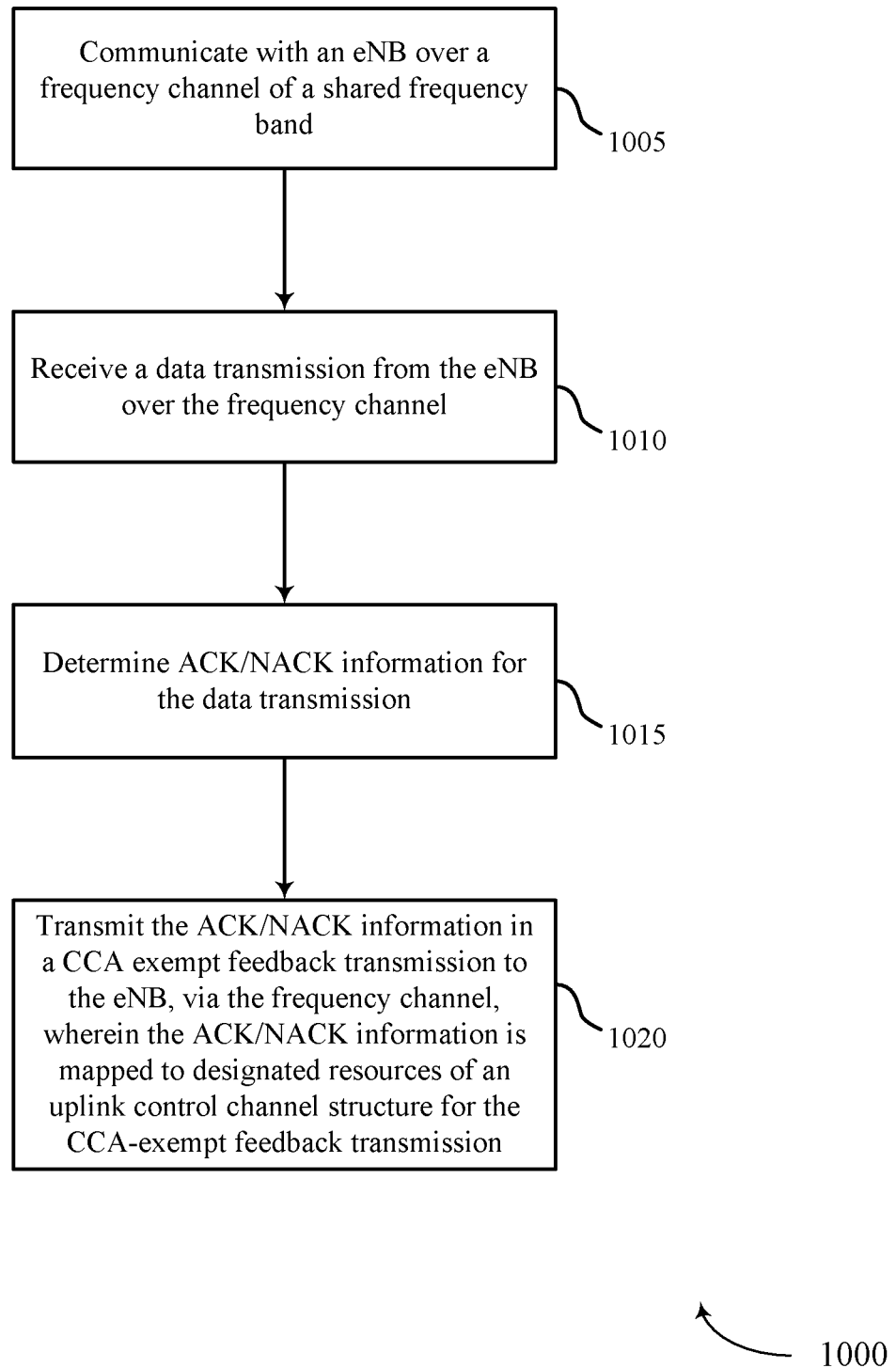
FIGS. 10-12 illustrate methods for channel feedback reporting for CCs (e.g., eCC in standalone operation, etc.) in accordance with various aspects of the present disclosure.

FIG. 10 shows a flowchart illustrating a method 1000 for channel feedback reporting for CCs (e.g., eCC in standalone operation, etc.) in accordance with various aspects of the present disclosure. The operations of method 1000 may be implemented by a device, such as a UE 115 or base station 105, or its components as described with reference to FIGS. 1-9. For example, the operations of method 1000 may be performed by the feedback reporting manager 510 as described with reference to FIGS. 5-8. In some examples, a device may execute a set of codes to control the functional elements of the device to perform the functions described below. Additionally or alternatively, the device may perform aspects the functions described below using special-purpose hardware.

At block 1005, the device may communicate with an eNB over a frequency channel of a shared frequency band as described with reference to FIGS. 2-4. In certain examples, the operations of block 1005 may be performed by the communications manager 605 as described with reference to FIG. 6.

At block 1010, the device may receive a data transmission from the eNB over the frequency channel of the shared frequency band as described with reference to FIGS. 2-4. In certain examples, the operations of block 1010 may be performed by the receiver 505 as described with reference to FIG. 5.

At block 1015, the device may determine ACK/NACK information for the data transmission as described with reference to FIGS. 2-4. In certain examples, the operations of block 1015 may be performed by the feedback processor 610 as described with reference to FIG. 6.

At block 1020, the device may transmit the ACK/NACK information in a CCA exempt feedback transmission to the eNB via the frequency channel of the shared frequency band, wherein the ACK/NACK information is mapped to designated resources of an uplink control channel structure for the CCA-exempt feedback transmission as described with reference to FIGS. 2-4. In certain examples, the operations of block 1020 may be performed by the transmitter 515 as described with reference to FIG. 5.

Figure 11:
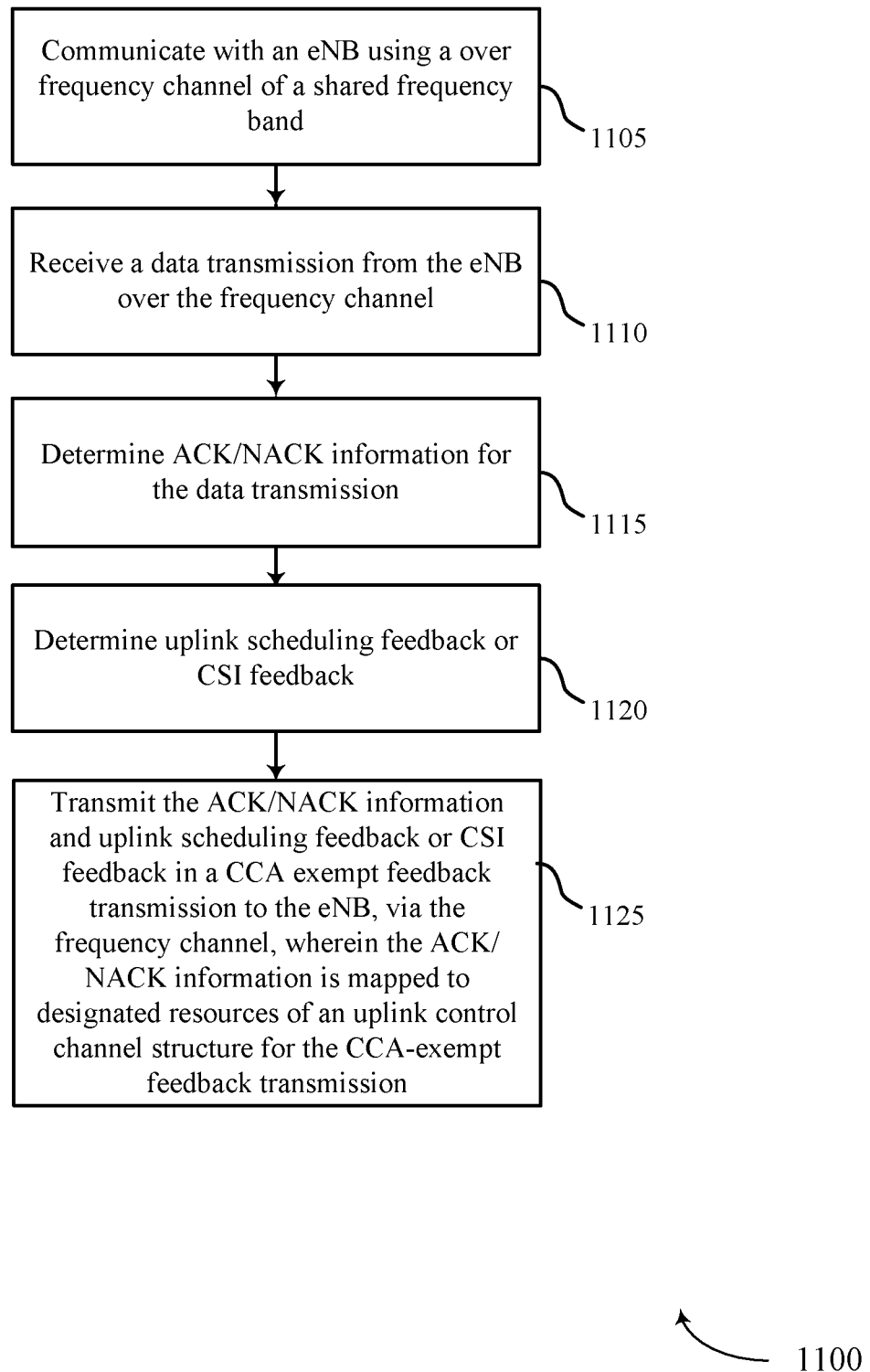

FIG. 11 shows a flowchart illustrating a method 1100 for channel feedback reporting for CCs (e.g., eCC in standalone operation, etc.) in accordance with various aspects of the present disclosure. The operations of method 1100 may be implemented by a device, such as a UE 115 or base station 105, or its components as described with reference to FIGS. 1-9. For example, the operations of method 1100 may be performed by the feedback reporting manager 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1100 may also incorporate aspects of method 1000 of FIG. 10.

At block 1105, the device may communicate with an eNB using a CC over a shared frequency band as described with reference to FIGS. 2-4. In certain examples, the operations of block 1105 may be performed by the communications manager 605 as described with reference to FIG. 6.

At block 1110, the device may receive a data transmission from the eNB over the CC as described with reference to FIGS. 2-4. In certain examples, the operations of block 1110 may be performed by the receiver 505 as described with reference to FIG. 5.

At block 1115, the device may determine ACK/NACK information for the data transmission as described with reference to FIGS. 2-4. In certain examples, the operations of block 1115 may be performed by the feedback processor 610 as described with reference to FIG. 6.

At block 1120, the device may determine uplink scheduling feedback or CSI feedback as described with reference to FIGS. 2-4. Determining the CSI feedback may include determining a target MCS for a subsequent uplink data transmission based at least in part on channel measurements of one or more reference signals associated with the data transmission In certain examples, the operations of block 1120 may be performed by the feedback processor 610 and/or the channel quality manager 705 as described with reference to FIGS. 6 and 7.

At block 1125, the device may transmit the ACK/NACK information in a CCA exempt feedback transmission to the eNB via the CC, wherein the ACK/NACK information is mapped to designated resources of an uplink control channel structure for the CCA-exempt feedback transmission as described with reference to FIGS. 2-4. In some cases, the device may transmit, in the CCA-exempt feedback transmission, the uplink scheduling feedback or the CSI feedback as described with reference to FIGS. 2-4. In some cases, the transmitted CSI feedback comprises an indicator associated with the determined target MCS. In certain examples, the operations of block 1125 may be performed by the transmitter 515 as described with reference to FIG. 5.

Figure 12:
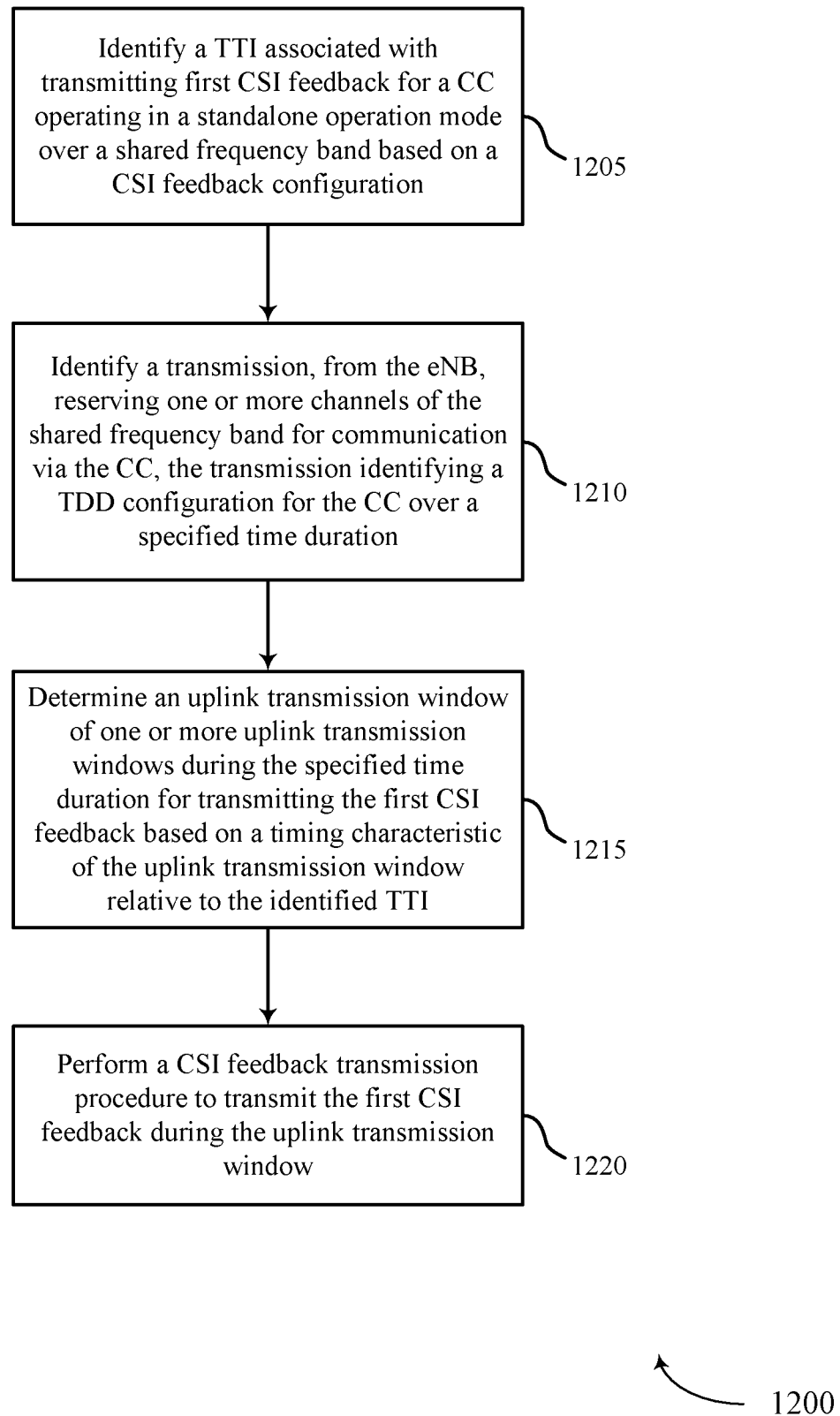

FIG. 12 shows a flowchart illustrating a method 1200 for channel feedback reporting for CCs (e.g., eCC in standalone operation, etc.) in accordance with various aspects of the present disclosure. The operations of method 1200 may be implemented by a device, such as a UE 115 or base station 105, or its components as described with reference to FIGS. 1-9. For example, the operations of method 1200 may be performed by the feedback reporting manager 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1200 may also incorporate aspects of methods 1000, and 1100 of FIGS. 10-11.

At block 1205, the device may identify a TTI associated with transmitting first CSI feedback for a CC operating in a standalone operation mode over a shared frequency band based at least in part on a CSI feedback configuration as described with reference to FIGS. 2-4. In certain examples, the operations of block 1205 may be performed by the channel monitor 720 as described with reference to FIG. 7.

At block 1210, the device may identify a transmission, from the eNB, reserving one or more channels of the shared frequency band for communication via the CC, the transmission identifying a TDD configuration for the CC over a specified time duration as described with reference to FIGS. 2-4. In certain examples, the operations of block 1210 may be performed by the communications manager 605 as described with reference to FIG. 6.

At block 1215, the device may determine an uplink transmission window of one or more uplink transmission windows during the specified time duration for transmitting the first CSI feedback based at least in part on a timing characteristic of the uplink transmission window relative to the identified TTI as described with reference to FIGS. 2-4. In certain examples, the operations of block 1215 may be performed by the feedback processor 610 as described with reference to FIG. 6.

At block 1220, the device may perform a CSI feedback transmission procedure to transmit the first CSI feedback during the uplink transmission window as described with reference to FIGS. 2-4. In certain examples, the operations of block 1220 may be performed by the feedback processor 610 as described with reference to FIG. 6.

Thus, methods 1000, 1100, and 1200 may provide for CQI feedback reporting for eCC. It should be noted that methods 1000, 1100, and 1200 describe possible implementation, and that the operations and the steps may be rearranged or otherwise modified such that other implementations are possible. In some examples, aspects from two or more of the methods 1000, 1100, and 1200 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications subsystem 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a user equipment (UE), comprising:
communicating with an evolved node B (eNB) over a frequency channel of a shared frequency band;
receiving a data transmission from the eNB over the frequency channel of the shared frequency band;
determining acknowledgement/negative acknowledgement (ACK/NACK) information for the data transmission; and
transmitting the ACK/NACK information in a clear channel assessment (CCA) exempt feedback transmission to the eNB via the frequency channel of the shared frequency band, wherein the ACK/NACK information is mapped to designated resources of an uplink control channel structure for the CCA-exempt feedback transmission.

2. The method of claim 1, further comprising:
determining uplink scheduling feedback or channel state information (CSI) feedback; and
transmitting, in the CCA-exempt feedback transmission, the uplink scheduling feedback or the CSI feedback.

3. The method of claim 2, further comprising:
determining a target modulation and coding scheme (MCS) for a subsequent data transmission based at least in part on channel measurements of one or more reference signals associated with the data transmission; and
wherein the transmitted CSI feedback comprises an indicator associated with the target MCS.

4. The method of claim 3, further comprising:
identifying a current MCS for the data transmission; and
determining a channel quality delta between the current MCS and the target MCS,
wherein the indicator associated with the target MCS comprises the channel quality delta.

5. The method of claim 3, wherein the one or more reference signals comprise any of a cell-specific reference signal (CRS), a demodulation reference signal (DM-RS), a UE-specific reference signal (UE-RS), or combinations thereof.

6. The method of claim 5, wherein the determining the target MCS for the subsequent data transmission comprises estimating a quality of a channel from the eNB based at least in part on the CRS and an identified precoding matrix for the data transmission.

7. The method of claim 1, wherein the uplink control channel structure comprises a subset of frequency resources of the frequency channel of the shared frequency band.

8. The method of claim 1, wherein the start of the CCA-exempt feedback transmission occurs less than a predetermined CCA time period from an end of the data transmission.

9. The method of claim 1, wherein the frequency channel of the shared frequency band comprises an enhanced component carrier (eCC) configured for the UE in a standalone operation mode.

10. The method of claim 1, further comprising:
receiving a feedback configuration for providing feedback for transmissions over the frequency channel of the shared frequency band, wherein the feedback configuration indicates providing the feedback in the CCA-exempt feedback transmission, a CCA-compliant feedback transmission, or combinations thereof.

11. An apparatus for wireless communication, comprising:
a processor;
memory in electronic communication with the processor; and
instructions stored in the memory and operable, when executed by the processor, to cause the apparatus to:

communicate with an evolved node B (eNB) over a frequency channel of a shared frequency band;

receive a data transmission from the eNB over the frequency channel of the shared frequency band;

determine acknowledgement/negative acknowledgement (ACK/NACK) information for the data transmission; and transmit the ACK/NACK information in a clear channel assessment (CCA) exempt feedback transmission to the eNB via the frequency channel of the shared frequency band, wherein the ACK/NACK information is mapped to designated resources of an uplink control channel structure for the CCA-exempt feedback transmission.

12. The apparatus of claim 11, wherein the instructions are operable to cause to:

determine uplink scheduling feedback or channel state information (CSI) feedback; and transmit, in the clear channel assessment (CCA)-exempt feedback transmission, the uplink scheduling feedback or the CSI feedback.

13. The apparatus of claim 12, wherein the instructions are operable to cause to:

determine a target modulation and coding scheme (MCS) for a subsequent data transmission based at least in part on channel measurements of one or more reference signals associated with the data transmission; and wherein the transmitted CSI feedback comprises an indicator associated with the target MCS.

14. The apparatus of claim 13, wherein the instructions are operable to cause to:

identify a current MCS for the data transmission; and determine a channel quality delta between the current MCS and the target MCS, wherein the indicator associated with the target MCS comprises the channel quality delta.

15. The apparatus of claim 13, wherein the one or more reference signals comprise any of a cell-specific reference signal (CRS), a demodulation reference signal (DM-RS), a UE-specific reference signal (UE-RS), or combinations thereof.

16. The apparatus of claim 15, wherein the determining the target MCS for the subsequent data transmission comprises estimating a quality of a channel from the eNB based at least in part on the CRS and an identified precoding matrix for the data transmission.

17. The apparatus of claim 11, wherein the instructions are operable to cause to:

receive a feedback configuration for providing feedback for transmissions over the frequency channel of the shared frequency band, wherein the feedback configuration indicates providing the feedback in the CCA-exempt feedback transmission, a CCA-compliant feedback transmission, or combinations thereof.

* * * * *